United States Patent
Simon

(10) Patent No.: US 7,825,796 B1
(45) Date of Patent: Nov. 2, 2010

(54) REMOTE SECURITY PANEL ACCESS SYSTEM FOR ENABLING ACCESS TO A PLURALITY OF REMOTE SECURITY PANELS AND METHODS OF ENABLING REMOTE PANEL ACCESS

(76) Inventor: Daniel Michael Simon, 430 S. Annandale Dr., Lake in the Hills, IL (US) 60156

( * ) Notice: Subject to any disclaimer, the term of this patent is extended or adjusted under 35 U.S.C. 154(b) by 321 days.

(21) Appl. No.: 12/098,249

(22) Filed: Apr. 4, 2008

(51) Int. Cl.
*G08B 1/08* (2006.01)
*G08B 9/00* (2006.01)
*G05B 23/02* (2006.01)

(52) U.S. Cl. ............... 340/539.17; 340/3.3; 340/286.02
(58) Field of Classification Search ................. 340/506, 340/539.17, 539.18, 540, 541, 3.1, 3.3, 286.02
See application file for complete search history.

(56) References Cited

U.S. PATENT DOCUMENTS

| | | | |
|---|---|---|---|
| 5,686,885 A * | 11/1997 | Bergman | ..................... 340/514 |
| 6,400,265 B1 | 6/2002 | Saylor et al. | |
| D460,262 S | 7/2002 | Isaacs et al. | |
| D460,621 S | 7/2002 | Isaacs et al. | |
| 6,661,340 B1 | 12/2003 | Saylor et al. | |
| 6,965,313 B1 | 11/2005 | Saylor et al. | |
| 6,972,676 B1 * | 12/2005 | Kimmel et al. | ............. 340/506 |
| 7,113,090 B1 * | 9/2006 | Saylor et al. | ........... 340/539.18 |
| 7,633,388 B2 * | 12/2009 | Simon et al. | ........... 340/539.17 |
| 7,679,503 B2 * | 3/2010 | Mason et al. | ............... 340/506 |
| 7,734,906 B2 * | 6/2010 | Orlando et al. | ............. 713/150 |
| 2006/0022820 A1 * | 2/2006 | Martin et al. | .......... 340/539.19 |
| 2007/0113029 A1 | 7/2007 | Nishio | |
| 2007/0229301 A1 * | 10/2007 | Katz | ..................... 340/825.72 |
| 2008/0079561 A1 | 4/2008 | Trudle et al. | |

OTHER PUBLICATIONS

Alarm.com: Security, Evolved., http://www.alarm.com/index.asp, Available on and before Jul. 11, 2008.
Brivo Systems, http://www.brivo.com/, Available on and before Jul. 11, 2008.
Reach Systems, http://www.reachsystems.com/index.html, available on and before Jul. 28, 2008.
The OzVision Secure Network, Transforming IP-Based Video Solutions for Security Service Providers published Jun. 14, 2006.

* cited by examiner

*Primary Examiner*—Jennifer Mehmood
(74) *Attorney, Agent, or Firm*—K&L Gates LLP

(57) ABSTRACT

A system and methods for enabling a client terminal to simultaneously access a plurality of remote building security panels are disclosed. The system enables a building operator to remotely login to a server and to monitor and control the sensors of the security systems of a plurality of secured buildings. The system in one embodiment includes a database controller, an interface provider, and an alarm receiver. The alarm receiver sends and receives data to and from each building security system. The database controller stores data received by the alarm receiver from each building security system in a database and stores a plurality of command requests for causing remote security panels to execute a plurality of commands, and the interface module enables a remote operator to input commands and requests to query the database, monitor each building security system, and control individual sensors or actuatable security devices.

8 Claims, 22 Drawing Sheets

FIG. 8

| Site | Area | Number & Name | | Status | |
|---|---|---|---|---|---|
| Demo Site | Inventory | 12 | INVENTORY DR | Normal | Refresh Status |
| Demo Site | 24 Hour | 8 | FIRE | Normal | Refresh Status |
| Demo Site | Office | 4 | OFFICE MOTION | Normal | Refresh Status |
| Demo Site | Warehouse | 1 | N WHSE DR | Fault | Refresh Status |
| Demo Site | Warehouse | 2 | S WHSE DR | Normal | Refresh Status |
| Demo Site | Warehouse | 3 | WHSE MOTION | Normal | Refresh Status |

FIG. 12

17 Events from Mar 04, 2008 12:00:00 am to Mar 04, 2008 11:59:59 pm

| Date/Time | Site | Area | Event Type | User | Event |
|---|---|---|---|---|---|
| Mar 04, 2008 2:58:37 pm CST | System | | User Session | Admin | User Login Successful |
| Mar 04, 2008 2:58:22 pm CST | System | | User Session | Admin | User Logout Successful |
| Mar 04, 2008 2:57:47 pm CST | System | | User Session | Admin | User Login Successful |
| Mar 04, 2008 12:09:00 pm CST | System | | User Session | Admin | User Logout Successful |
| Mar 04, 2008 10:04:54 am CST | Demo Site | | System Message | | Remote Programming Complete 70NN05006024YN |
| Mar 04, 2008 10:04:54 am CST | Demo Site | | System Message | | Remote Command Received |
| Mar 04, 2008 10:04:45 am CST | Demo Site | | System Message | | WARNING: Remote Programming |
| Mar 04, 2008 10:03:29 am CST | System | | User Modification | Admin | Alarm User:17 Pete Schlossman, Modified for Alarm at Demo Site |
| Mar 04, 2008 10:03:29 am CST | System | | User Modification | Admin | User: Pete Schlossman, Modified |
| Mar 04, 2008 10:03:00 am CST | System | | User Modification | Admin | Alarm User:17 Pete Schlossman, Added to Alarm at Demo Site |
| Mar 04, 2008 10:02:51 am CST | System | | User Modification | Admin | User: Pete Schlossman, Added |
| Mar 04, 2008 9:59:24 am CST | Demo Site | | System Message | | Remote Programming Complete 70NN05006024YN |
| Mar 04, 2008 9:59:09 am CST | Demo Site | | System Message | | WARNING: Remote Programming |
| Mar 04, 2008 9:59:08 am CST | Demo Site | | System Message | | Remote Programming Complete 70NN05006024YN |
| Mar 04, 2008 9:58:39 am CST | System | | User Session | Admin | User Login Successful |
| Mar 04, 2008 3:42:03 am CST | Demo Site | | System Message | | Request for Time and Date Sync |
| Mar 04, 2008 3:42:02 am CST | Demo Site | | Time Message | | Set Successfully |

REMOTE SECURITY PANEL ACCESS SYSTEM FOR ENABLING ACCESS TO A PLURALITY OF REMOTE SECURITY PANELS AND METHODS OF ENABLING REMOTE PANEL ACCESS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present disclosure relates in general to a system and methods for providing access to a plurality of remote security panels, and in particular to a system including a server for implementing an interface provider, a database controller, and an alarm receiver, which co-act to enable an operator of a plurality of buildings (each protected by a security system) to remotely access the security panel of each building.

BACKGROUND

For years, building security systems have included a security panel mounted in the building (such as in a basement) and a user input device such as a keypad mounted on a wall inside the building (such as near an entryway). Such security systems have also included a plurality of security sensors connected to the security panel. In these security systems, the keypad enables a security operator to arm the security system, to disarm the security system, to access data indicative of the states of the security sensors, and to selectively and individually disarm one or more of the sensors. Such security systems provide information about sensed security activities and enable a security operator to disarm the security sensors if the security operator is physically present on the premises of the building.

More recent security systems include a security panel configured to be connected to a computer system associated with the building. The computer system is configured to receive data about the state of the security sensors of the building and to issue commands to enable and disable the sensors. Such computer systems are configured to send and receive data over a network maintained by a building security operator, such as a Virtual Private Network (VPN), which enables the security operator to remotely access the security panel associated with the computer system by accessing the security panel through such security system. The added flexibility provided by more recent security systems enables a security operator to manage a single building without being physically located on the premises of the building, but requires the operator to serve as a network administrator.

Despite enabling remote access to a building security system as noted above, known security systems possess a number of drawbacks which prevent them from being as efficient, effective, and secure as possible.

Known security systems require duplication of hardware, which makes such systems needlessly expensive. Each building having a known security system requires one or more dedicated host computer systems to function as a host computer. Each dedicated host computer includes a microprocessor, a memory device, and an always-on connection to the Internet. Moreover, each dedicated host computer includes one or more layers of software running on the host computer, which frequently each include a software license fee. Each host computer also includes hardware to enable the sensors of the system to interface with the dedicated host computer. This interface hardware either enables the sensors to communicate directly with the host computer, or enables the host computer to communicate with the security panel. The host computer of each building must either function as or be connected to a secure server to enable remote access and generally must include either a hardware or software firewall to ensure secure remote access. Thus, the cost of monitoring additional remote buildings is multiplied depending on the number of additional remote buildings.

Moreover, known security systems only enable sequential control of multiple panels upon successive logins to the individual computer systems of the respective buildings (i.e., an operator must login to a separate panel each time the operator wishes to download data from a security panel). Known security systems include drawbacks stemming from requiring an operator to sequentially login to the dedicated host computer of each of a plurality of buildings. Specifically, for known security systems: (1) the number of dedicated host computers needed is equal to the number of monitored buildings; (2) any software on the host computers must be separately installed and updated for each computer; (3) any system-wide security schedule changes must be separately made for each building; (4) real-time system-wide monitoring of sensed security activities is difficult if not impossible; (5) sensed security activity reports must be downloaded separately for each building; (6) any input information applicable to more than one building must be entered separately for each building; and (7) a security operator must serve as a network administrator and maintain a plurality of networked computers.

Finally, known security systems present electronic security risks in addition to the traditional security concerns associated with operating a building. As with any firewall that limits remote access to a computer system, the firewalls required for known security systems are vulnerable to electronic attack. This risk is multiplied by the fact that multiple host computers are connected to the network, so any anti-hacking measures must be implemented for each computer and/or each firewall. The consequences of a breach of a security system are particularly high given that unwanted remote access to a security panel can result in unwanted physical access to the associated building. Finally, since security operators are not typically experienced network administrators, anti-hacking measures are limited by the technical expertise of non-technical personnel.

There is a need for a remote security panel access system to overcome the above-noted deficiencies. There is a further need for a panel access system to enable remote manipulation and monitoring of the security panels of a plurality of buildings without requiring duplicate hardware. There is a further need to for a panel access system to enable substantially simultaneous remote access to the security panels of a plurality of buildings. There a further need for a panel access system to enable vendors to efficiently ensure that remote access software versions are current. There is a further need for a panel access system to effectively prevent unwanted remote access to the security panels of a plurality of buildings.

SUMMARY

In certain embodiments, the remote panel access system disclosed herein includes a computer or a computer system configured to function as a server. In one embodiment, the server is configured to implement an interface provider, a database controller, and an alarm receiver. The interface provider causes an interface to be displayed to an operator, the database controller stores and retrieves data from a database of the server, and the alarm receiver communicates with the database controller and with a plurality of remote security panels. In one embodiment, the interface provider, the database controller, and the alarm receiver of the system enable a security operator to login to the remote panel access system and to request real-time and/or historical data about a plurality of security sensors connected to the security panels of each of a plurality of secured buildings. In another embodiment, a plurality of alarm panels are configured to periodically connect to the system and to provide a predefined set of data about sensors in a plurality of buildings. In this embodiment, the system is configured to store the downloaded data in a database. The system then enables an operator to retrieve and view any data stored in the database without establishing a connection to a remote security panel. In various embodiments, the system is further configured to enable an operator to store a plurality of command requests as events in an event queue, such that when a security panel establishes a connection with the system, the security panel executes the stored commands and provides any responsive data for storage. In one embodiment, this enables an operator to actuate a plurality of actuatable security sensors and to request a customized set of sensor data.

In one embodiment, the server disclosed herein includes various hardware such as a microprocessor, a memory device, and at least one network interface device. The hardware is configured to co-act to execute the interface provider, the database controller, and the alarm receiver. In one embodiment, the microprocessor is configured to execute a series of instructions stored on the memory device to implement the interface provider, the database controller, and the alarm receiver as software modules. In this embodiment, the interface provider is implemented as a web server module, the database controller is implemented as a database module, and the alarm receiver is implemented as an alarm receiver module. Further, in this embodiment, the memory device is also configured to store a plurality of data in a database which is accessible only by the database controller. It should be appreciated that in this embodiment, communications between the various software modules is encrypted using a suitable encryption algorithm.

In various embodiments, the server includes at least one printed circuit board (PCB) implementing one or more of the interface provider, the database controller, and the alarm receiver as a hardware module. In these embodiments, the microprocessor of the server causes the interface provider, the database controller, and the alarm receiver to co-act with the network interface device to enable messages to flow between the server and a plurality of remote security panels.

More specifically, in one embodiment, the interface provider is configured to validate login information for a remote operator logging in to the system via the Internet. Once validation is established, the interface provider is configured to enable encrypted communication between the user terminal and the server and to send any operator-input data requests and command requests to the database controller for execution.

The database controller is configured in one embodiment to store data retrieved about a plurality of security sensors, to store command requests input by an operator at a user terminal as events in an event queue, and to retrieve previously stored sensor data.

In one embodiment, the alarm receiver is configured to enable communication with a plurality of remote security panels over the Internet or other suitable network using a communication protocol designed specifically for enabling communication with a remote security panel. The alarm receiver is configured to establish a connection with a security panel in response to a security panel connection request, and to provide the security panel access to the event queue stored in the database for handling.

In various embodiments, each security panel is configured to establish a connection with the system based on a predefined schedule. In one such embodiment, each security panel attempts to establish a connection with the alarm receiver of the system and to execute any events in an event queue of the database.

In one embodiment, each security panel is also configured to establish a connection with the server each time a security condition change is detected. In this embodiment, a security condition change is a change effected by a user on the premises of a secured property. To ensure that any data stored in the database is current, the system establishes a connection and provides the database with data indicative of the security condition change.

In one embodiment, the interface provider causes an interface to be displayed which enables an operator to use an input device to request data stored in the database of the system. It should be appreciated that this data in various embodiments indicates historical data sensed by a plurality of remote security sensors. Upon receiving a request for data, the interface provider sends a message to the database controller to determine if the requested data is in the database. If the data is already in the database (e.g., the request is for historical sensor data), the database controller sends the stored data to the interface provider for display to the operator. If the data is not stored on the memory device (e.g., the request is for real-time data), the database controller stores a command request in the database that, when transferred to the event queue and executed by a security panel, causes the security panel to provide the requested data. The next time a security panel establishes a connection with the system, the alarm receiver provides the command request to the security panel for execution, stores the resulting data, and forwards it to the interface provider for remote display.

In another embodiment, the interface provider causes the display of an interface to enable an operator to actuate an actuatable security sensor by issuing a command to a security panel. In this embodiment, the interface provider receives a command request and sends the command request to the database controller. The database controller stores the command request as an event in an event queue in the database for future execution. When the appropriate security panel establishes a connection with the system, the alarm receiver provides the security panel with access to the event queue, such that the security panel can execute any events contained therein. The alarm receiver is configured to receive a response from the security panel indicating whether the event was handled appropriately. The alarm receiver sends the response to the database controller for storage in the database and for forwarding to the interface provider for remote display.

It should be appreciated that the panel access system provides an interface to enable an operator to remotely monitor and issue command requests to the security sensors of a plurality of buildings. It should also be appreciated that the system enables a plurality of security panels to automatically provide sensor data for storage in a database, such that an operator can access the downloaded security sensor data without establishing a remote security panel connection. It should also be appreciated that the system provides an interface to enable an operator to remotely manage sensor activation schedules, and user access schedules. It should be further appreciated that the system avoids the disadvantages of having multiple computers to access the security panels of known security systems by enabling single software updates and by reducing the opportunity for multiple security threats.

It is therefore an advantage of the present disclosure to enable an operator to request and receive near real-time data about the sensor states of a plurality of sensors in each of a plurality of buildings.

It is a further advantage of the present disclosure to enable an operator to analyze historical data about the states of a plurality of sensors in each of a plurality of buildings.

It is a further advantage of the present disclosure to enable an operator to send commands to a plurality of actuatable security sensors in each of a plurality of buildings.

It is a further advantage of the present disclosure to enable simultaneous updating of parameters of security systems in a plurality of secured buildings.

It is a still further advantage of the system of the present disclosure to enable secure access to a plurality of security panels of a plurality of buildings without requiring hardware in addition to the single server, the security sensors, and the security panel for each building.

Additional features and advantages of the present invention are described in, and will be apparent from, the following Detailed Description of Exemplary Embodiments and the figures.

DESCRIPTION OF THE DRAWINGS

FIG. 8 is a screen shot illustrating an example embodiment of the user interface presented by the interface provider of the remote panel access system disclosed herein summarizing security sensor grouping data arranged by zone.

FIG. 12 is a screen shot illustrating an example embodiment of the user interface presented by the interface provider of the remote panel access system disclosed herein displaying the contents of a report.

FIG. 17 is a screen shot illustrating an example embodiment of the user interface presented by the interface provider of the remote panel access system disclosed herein for enabling the operator to add or edit a profile to define a plurality of physical access permissions for a user at a secured building.

FIG. 19 is a screen shot illustrating an example embodiment of the user interface presented by the interface provider of the remote panel access system disclosed herein for enabling an operator to add or edit a schedule.

FIG. 20 is a screen shot illustrating an example embodiment of the user interface presented by the interface provider of the remote panel access system disclosed herein for enabling an operator to define a plurality of holidays.

DETAILED DESCRIPTION OF EXEMPLARY EMBODIMENTS

Figure 1:
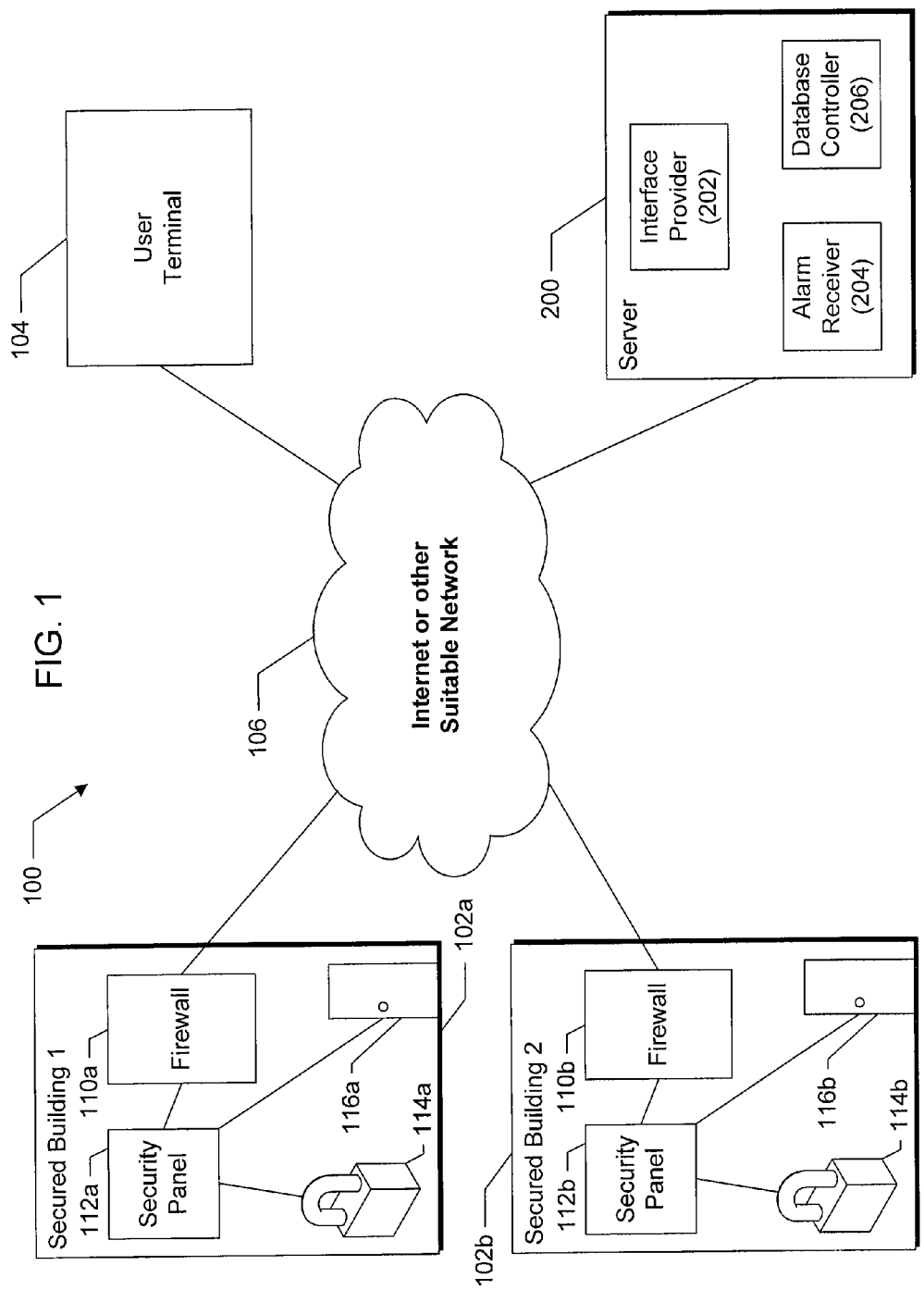
FIG. 1 is a schematic diagram of an example network for implementing the remote panel access system disclosed herein including a server, a remote user terminal, and two remote secured buildings.

Referring now to the figures, FIG. 1 illustrates a schematic diagram of an example network 100 including the security panel access system disclosed herein. As illustrated in FIG. 1, the remote access system is implemented by server 200. In the illustrated embodiment, server 200 is configured to send and receive messages via the Internet or other suitable network 106 to enable communication between the security panels 112a and 112b of two secured buildings 102a and 102b and a building operator at a remote user terminal 104. It should be appreciated that various embodiments of the system disclosed herein enable communication between the panel access system disclosed, a plurality of secured buildings, and a plurality of remote user terminals, wherein each secured building has one or more associated security panels.

In one embodiment of the security panel access system disclosed, the server 200 is configured to send messages between the user terminal 104 and the plurality of secured buildings 102a and 102b. In this embodiment, the server 200 sends and receives messages to and from the user terminal 104 via the Internet or another suitable network 106. The messages are encrypted to prevent interception and malicious use of any data contained in the messages. Similarly, the system enables communication between the server 200 and the plurality of buildings 102a and 102b by sending and receiving messages via the Internet or other suitable network 106. In one such embodiment, the messages sent between a building security panel and the alarm receiver are sent using a protocol designed to facilitate communication with a remote security panel to prevent interception and malicious use of such messages. It should be appreciated that in the illustrated embodiment, the user terminal 104, the server 200, and the secured buildings 102a and 102b are each located at different locations—that is, they are located physically separately from one another.

In the illustrated embodiment, the server 200 is configured to implement the remote security panel access system disclosed herein. The server 200 includes at least one microprocessor, at least one memory device, and at least one network interface device (not shown). The at least one microprocessor is configured in one embodiment to execute a plurality of instructions stored on the at least one memory device and to send and receive a plurality of messages using the at least one network interface device. More specifically, the hardware of the server 200 is configured to implement an interface provider 202, a database controller 206, and an alarm receiver 204. In various embodiments, the interface provider 202 is a web server module, the alarm receiver 204 is an alarm receiver module, and the database controller 206 is a database module. In one embodiment, the microprocessor is configured to implement each of the modules based entirely on a plurality of commands stored on the memory device. In another embodiment, one or more of the modules include a software component and a hardware component. In this embodiment, the code to implement a portion of at least one of the modules is contained on read-only hardware such as a printed circuit board (PCB).

It should be appreciated that the interface provider 202, the alarm receiver 204, and the database controller 206 are configured communicate with each other and with the at least one network interface device to enable the server 200 to send and receive messages between the user terminal 104 and the server 200 and between the server 200 and the security panels 112a and 112b of the secured buildings 102a and 102b. The various precise functionalities of the interface provider, the alarm receiver, and the database controller are discussed in greater detail below.

As illustrated in FIG. 1, the system enables an operator at a user terminal 104 to communicate with a plurality of security panels of a plurality of buildings such as secured buildings 102a and 102b. In various embodiments, the user terminal 104 includes at least one microprocessor, at least one memory device, at least one input device, at least one display device, and at least one network interface device. In one embodiment, the microprocessor is configured to execute instructions stored on the at least one memory device to enable an operator to send requests and receive data at the remote terminal 104 to send and receive messages to and from the server 200 via the Internet or other suitable network 106.

In the illustrated embodiment, the secured buildings 102a and 102b each include a firewall 110a and 110b and a security panel 112a and 112b. In this embodiment, the firewall 110a or 110b is connected to the Internet or other suitable network 106 to enable communication between the each security panel 112a and 112b and the server 200. In the illustrated embodiment, the firewall 110a or 110b is configured to enable only outgoing network traffic—that is, to enable only messages initiated by the security panel 112a or 112b. It should be appreciated that the firewall is configured to ensure that no incoming messages representing possible threats to security are allowed to reach the security panels of the secured buildings. In various embodiments, the firewall is a software firewall implemented by hardware included in the security panel 112a or 112b. In alternative embodiments, each building security system includes one or more dedicated host computers (not shown) to enable an on-site security operator to access the security panel to perform a plurality of security tasks. In these embodiments, the security panels of the building security systems are operatively connected to the one or more dedicated host computers. Further, the dedicated host computers are configured to implement a software firewall to only enable messages originating at the security panel. In still another embodiment, the firewall 110a or 110b is implemented by a dedicated hardware firewall device configured to parse any received messages to determine origination information and block or allow the messages based on the originator information.

In various embodiments, secured buildings include a plurality of security sensors. In one such embodiment, illustrated in FIG. 1, each secured building 102a and 102b includes a lock 114a or 114b and a door sensor 116a or 116b. In different embodiments, not illustrated, the buildings include a plurality of other security sensors capable of indicating one or more security sensor states.

In the illustrated embodiment, the security sensors of the secured buildings 102a and 102b are each configured to send one or more signals indicating a state of the security sensor to the security panel 112a or 112b. For instance, door sensors 116a and 116b are configured to send signals to the security panels 112a and 112b via the firewall 110a and 110b indicative of whether the door of the secured building 102a or 102b is ajar.

The secured buildings of the illustrated embodiment also include actuatable security sensors. In such embodiments, if the security panel sends an appropriate signal to an actuatable security sensor, at least one security structure of the actuatable security sensor is actuated such that the state of the security sensor changes. For instance, if an appropriate signal is sent to security lock 114a or 114b, the lock 114a or 114b actuates and changes states from either a locked state to an unlocked state or from an unlocked state to a locked state.

It should be appreciated that in various embodiments, the security sensors enable a remotely-located security operator to monitor the states of the security sensors, issue commands to change the states of the security sensors, and review data indicative of monitored security activities sensed by the security sensors. It should be further appreciated that various security sensors are configured to receive data and change states based on the data, receive data and actuate based on the data, send data indicative of a detected activity, or a combination thereof. For example, security locks 114a and 114b are configured to actuate an actuatable security sensor based on the data (i.e., lock or unlock the security lock) and send data indicating a detected activity (i.e., send data indicative of the new locked state).

Figure 2:
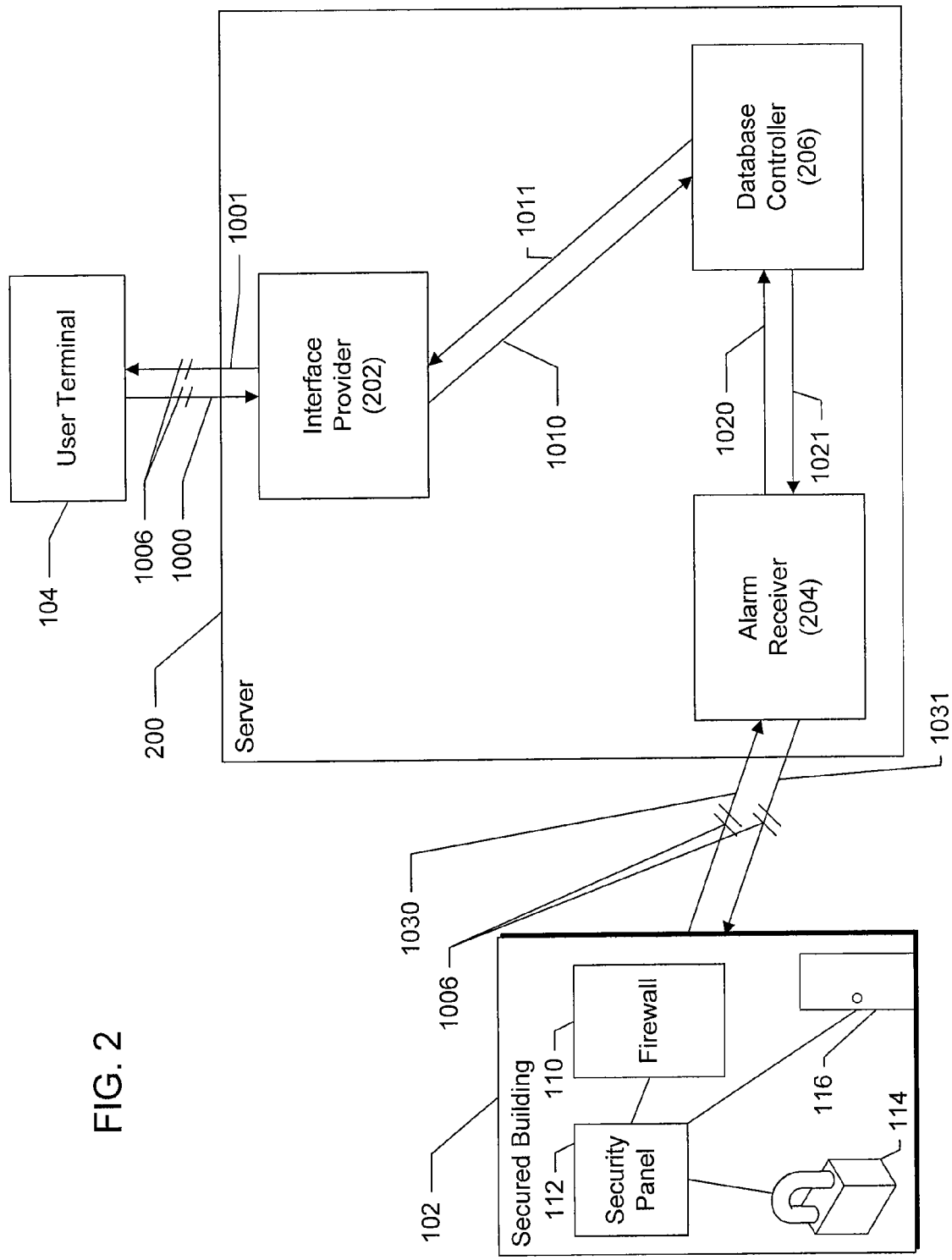
FIG. 2 is an example message flow diagram illustrating the flow of messages between the components of the system disclosed herein, between the system disclosed herein and a remote user terminal, and between the system disclosed herein and a control panel of a remote secured building.

FIG. 2 illustrates a schematic diagram of the message flow that occurs in an example embodiment of the security panel access system disclosed herein. In the illustrated embodiment, the server 200 is configured to send messages to and receive messages from the user terminal 104 and the secured building 102. Moreover, the interface provider, the alarm receiver, and the database controller of the server 200 are configured to communicate with one another.

In one embodiment, the server 200 is configured to send messages to the security panels 112 of a plurality of buildings. It should be appreciated that for brevity, FIG. 2 illustrates messages transmitted between the server 200 and only a single secured building 102. It should be further appreciated that for clarity, FIG. 2 does not illustrate the Internet or other network 106. Rather, the message flow diagram of FIG. 2 simply indicates the source and the destination of each of a plurality of messages. Any messages sent or received by the server 200 over the Internet or other suitable network 106 are indicated by hashes 1006. For brevity, any message flow described below will refer to messages being sent to and from the security panel 112. It should be appreciated that in various embodiments, messages are in reality routed through the firewall 110.

As used below, an event is an operation stored in the database indicative of an activity to performed by one or more remote security panels upon establishing a connection with a server 200 as disclosed herein. In various embodiments, events include commands to download security sensor data, actuate actuatable security sensors, update security schedules on a security panel, update rules, update profiles, or to perform any other suitable action. It should be further appreciated that in one embodiment events do not accrue on a security panel—rather, if a security panel detects a change that it needs to communicate to the server 200, the security panel initiates a connection immediately to communicate any required data to the server.

In the illustrated embodiment, the server 200 includes a processor, a memory device, and a network interface device as noted above. The processor is configured to co-act with the memory device and the network interface device to implement an interface provider 202, an alarm receiver 204, and a database controller 206. Generally, the interface provider 202 is configured to enable interaction between an operator at a user terminal 104 and the server 200, the alarm receiver 204 is configured to route any messages received from a secured building to the appropriate destination in the server 200, and the database controller 206 is configured to generate queries based on requests made by an operator, store and retrieve historical data about a plurality of security sensor states in a data structure stored on the memory device of the server 200, and store a plurality of command requests as events in an event queue for later execution by a security panel 112 of a secured building 102.

It should be appreciated that in other embodiments, the server 200 may include additional system components, or various of the illustrated components may be combined, to implement a security panel access system. The illustrated components are provided by way of example only and are not intended to limit the scope of this disclosure.

In one embodiment, the system is configured to receive authentication information from an operator using the at least one input device of the user terminal 104 (not illustrated). In this embodiment, the server 200 is configured to receive a plurality of connection initialization messages from the user terminal 104, such as messages to establish the network transfer protocol, messages containing login information, and other messages necessary to facilitate the establishment of a secure network connection. In various such embodiments, the interface provider 202 is configured to validate the operator's login information and to send any necessary validation messages or heartbeat signals to maintain the established network connection between the server 200 and the user terminal 104.

The alarm receiver 204 is configured to receive messages initiated by the security panels 112 of one or more secured buildings 102. As illustrated by numerals 1006, the alarm receiver 204 transmits messages to and from the security panels 112 via the Internet or other suitable network 106. In various embodiments, the alarm receiver 204 is configured to send and receive a plurality of validation, authorization, and heartbeat messages to each of the security panels 112 of the secured buildings 102 in addition to the messages discussed below. In these embodiments, the additional, un-illustrated messages enable the alarm receiver 204 to authenticate and maintain the connection between the sever 200 and the security panels 112, as defined by the panel access protocol as discussed above.

After validating an operator's login information, the interface provider 202 provides an interface to enable the operator to make a plurality of requests. In one embodiment, the panel access system enables an operator to request data about a plurality of sensor states and to issue actuation commands to a plurality of actuatable security sensors.

In the illustrated embodiment, the interface provider 202 is configured to receive a message 1000 indicating a request for data about one or more sensors of one or more secured buildings. The interface provider in one embodiment is configured to forward the message 1000 indicating a request for data as message 1010 to the database controller 206 for processing. The database controller 206 is configured to parse the received message 1010 to determine the data request indicated by the message 1010. After parsing the appropriate data, the database controller performs a database query. The result of the query indicates whether the sought data is stored in the database, and if so, the value of the sought data. The database controller 206 sends a response message 1011 to the interface provider 202 for display to the operator at the user terminal 104.

In the illustrated embodiment, if the sought data was not present in the database, the database controller generates a command request based on the query such that upon connection of the appropriate security panel to the server 200. The command request is stored in an event queue, such that upon connection with an appropriate alarm panel, the panel executes the event. This process is discussed in detail below.

Referring still to FIG. 2, the interface provider 202 is also configured to receive a message 1000 including data indicative of a command request to actuate a security structure of one or more actuatable security sensors. The interface provider 202 provides an appropriate interface to enable an operator at a user terminal 104 to make such a request. Upon receiving such a message 1000, the interface provider 202 sends a message 1010 including data indicative of the command request to the database controller 206 for handling.

When the database controller 206 receives a message 1010 including a command request, it performs a database query to store an appropriate command request in the database. In one embodiment, the command request is stored as an event in an event queue, such that when the events of the queue are executed in order, the command request is executed. It should be appreciated that so storing a command in the database enables an appropriate security panel to connect with the server and execute the command request, to be discussed below.

In one embodiment, each security panel 112 of each secured building 102 connected to the server 200 is configured to establish a connection with the server at predetermined times. For example, each security panel may establish such a connection every six minutes. To establish such a connection, the security panel in one embodiment generates and sends a connection message 1030 over the Internet or other network, as indicated by hashes 1006. In one embodiment, the alarm receiver 204 is configured to receive such a message 1030 and to respond by sending message 1031 to indicate the connection has been established. In various embodiments, more than two messages are exchanged between the alarm receiver and the security panel—for example, the protocol defining the messages transferred may require that more than two messages be sent and received to successfully establish a connection.

Upon establishment of a connection, the alarm receiver 204 sends a message 1020 indicating the connection has been established to the database controller 206. In response, the database controller 206 sends a message 1021 to the alarm receiver 204 indicating that one or more command requests are pending in an event queue. The alarm receiver enables the security panel to evaluate each event in the event queue and read and retrieve any necessary data 1030 from the database. Based on the information contained in the command requests, the security panel executes the event and returns any information about any connected sensors requested by the command requests. The security panel in one embodiment sends a message 1030 indicating that an event in the event queue was executed and containing the requested data. It should be appreciated that in various embodiments, events included in the event queue are not all command requests—rather, certain of the events indicate changes to be made to one or more internal schedules, profiles, or other operating parameters of the security panel.

The alarm receiver 204 forwards any received data to the database controller as message 1020 for storage. Upon storage, the database controller provides any data sought by a data request of the user terminal by sending message 1011 to the interface provider 202 for display on the user terminal 104.

Figure 3:
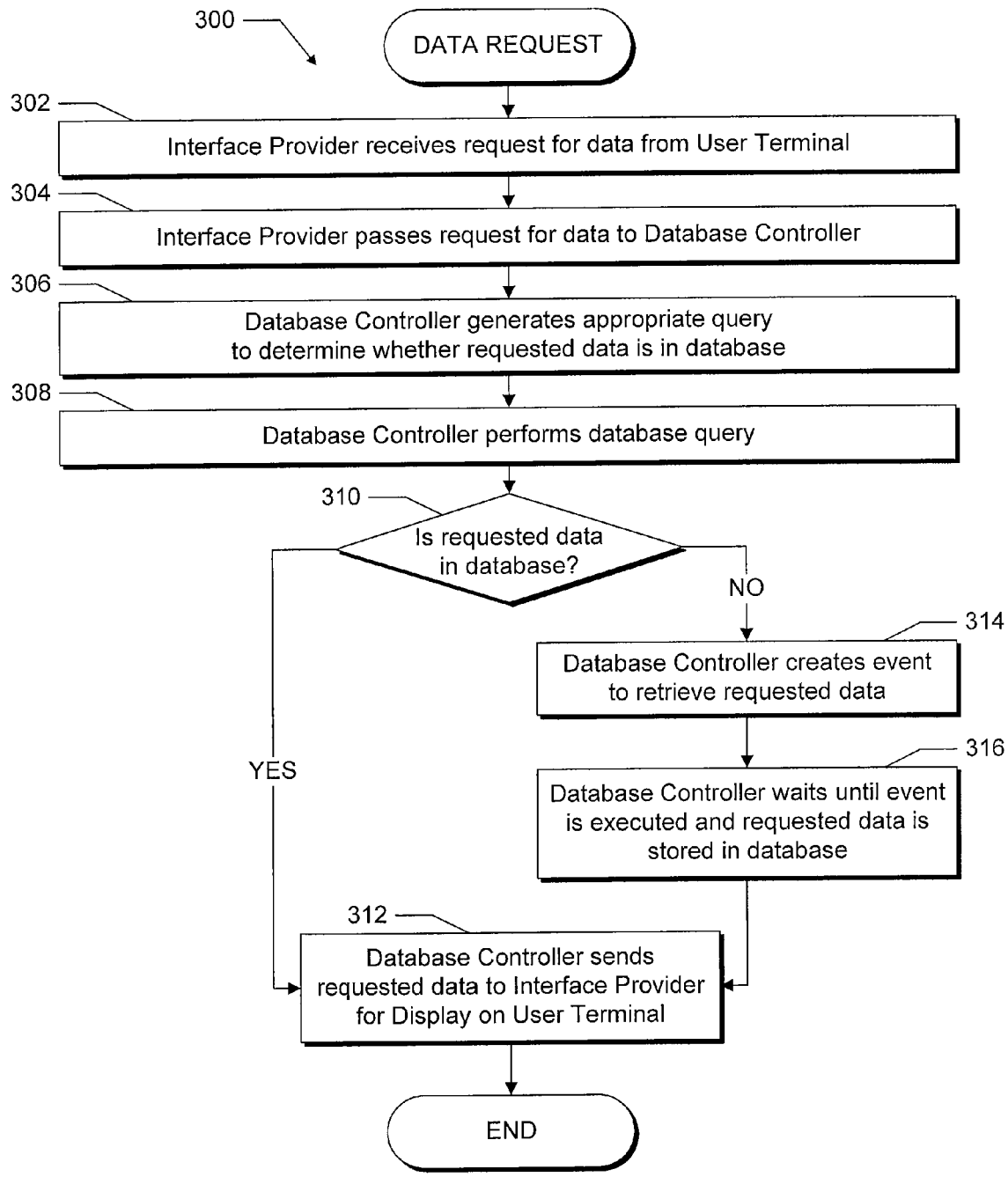
FIG. 3 is a flow chart of an example process for requesting data about states of sensors of a plurality of building security systems.

FIG. 3 illustrates a flow chart of an example process 300 for providing historical data in response to a data request by an operator at a remote terminal about the state of one or more sensors connected to one or more security panels. Although the example process 300 for providing sensor data is described with reference to the flow chart illustrated in FIG. 3, it should be appreciated that the system enables other processes for providing historical data based on an operator request for data. For example, the order of many of the blocks may be changed, and many of the blocks described are optional.

In the illustrated embodiment, the remote panel access system is configured to receive and handle a request from a remotely-located operator for data about one or more sensors of one or more security systems. In the illustrated embodiment, after establishing a secure connection with the remote user terminal, the interface provider receives a request for sensor data by way of the Internet or other suitable network, as indicated by block 302. The interface provider passes the request for data to the database controller for processing, as indicated by block 304.

As illustrated by process 300, the database controller receives and parses the message indicating a request for data to generate an appropriate database query, as indicated by block 306. The database controller performs a database query using the query generated from the request received from the alarm receiver, as indicated by block 308.

The results of the database query indicate whether the requested data is in the database, as indicated by block 310. If the data is in the database, the database controller retrieves the requested data and sends it to the interface provider for display on the remote user terminal, as indicated by block 312. It should be appreciated that in this embodiment, the only messages sent via an Internet or other network protocol are the data request and the response containing the requested sensor state data.

If the requested data is not in the database, as indicated by block 310, the database controller generates a command request to retrieve the requested data from the appropriate security panel, as indicated by block 314. As further indicated by block 314, the database controller stores the command request in the database for retrieval by the appropriate security panel. In one embodiment, to be discussed in detail below, the command request is generated and added as an event to an event queue stored in the database for future execution by one or more of the security panels.

The database controller then waits until the command is executed by the appropriate security panel and the data indicated by the command request is stored in the database, as indicated by block 316. As further indicated by block 316, the database controller stores the data returned to it by the alarm receiver upon execution of the command request. It should be appreciated that the execution and storage indicated by block 316 is described in detail below with reference to process 400 of FIG. 4. Once the command has been executed, the database controller retrieves the requested data from the database and returns it to the interface provider for display to the operator at the remote user terminal, as indicated by block 312.

It should be appreciated that data received in response to each command request is stored in the database of the system, such that a future request for the same data can be instantly satisfied based on stored data. It should further be appreciated that in this embodiment, the messages sent between the system and the user terminal are sent using an encrypted Internet or other network protocol. Thus, any messages sent between a remote security panel and the alarm receiver are sent using a security panel interface protocol to make interception and deciphering of the messages difficult, and to make efficient communication between the system and a security panel easy. It should be further appreciated that any messages sent between any security panel and the system are sent using a security panel access protocol to ensure the security of message sent and received by the system.

Figure 4:
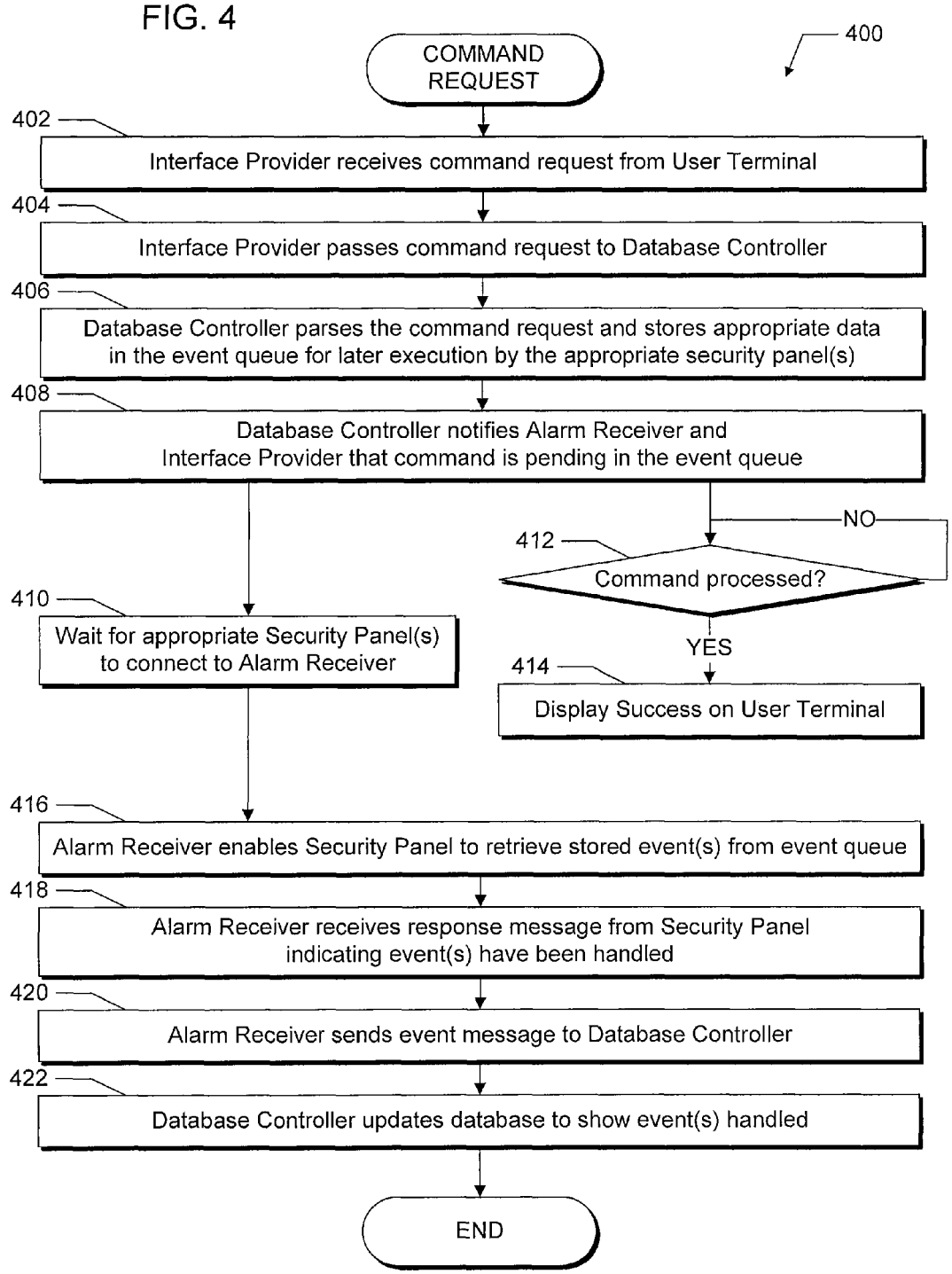
FIG. 4 is a flow chart of an example process for handing a command request made by an operator at a remote terminal to an actuatable security sensor of a remote security system.

FIG. 4 illustrates a flow chart of an example process 400 for issuing a command request to be executed by one or more security panels of one or more building security systems using the panel access system disclosed. Although the example process 400 for issuing a command request is described with reference to the flow chart illustrated in FIG. 4, it should be appreciated that the system disclosed herein enables other processes for issuing a command request. For example, the order of many of the blocks may be changed, and many of the blocks described are optional. It should be further appreciated that the system utilizes process 400 for issuing a command request when data requested as indicated in process 300, discussed above, is not found in the database. In such embodiments, the system executes process 400 as indicated by block 316 of FIG. 3.

As illustrated in FIG. 4, the panel access system disclosed herein enables an operator to remotely issue a command request to actuate a plurality of actuatable security sensors of a plurality of building security systems. The interface provider causes the remote user terminal to display an interface which enables an operator to remotely issue a command request to cause a plurality of actuatable security sensors to actuate, as indicated by block 402. Upon receiving such a command request, the interface provider forwards the request to the database controller for processing, as indicated by block 404.

In the illustrated embodiment, the database controller parses the request, determines the appropriate command(s) to be executed by the appropriate security panel(s) based on the request, and stores an event indicative of the appropriate command(s) in an event queue in the database, as indicated by block 406. The database controller also notifies the alarm receiver and the interface provider that one or more new events are pending in the event queue, as indicated by block 408. In one embodiment, upon receiving such notice that the event is pending, the interface provider causes a message to be displayed on the user terminal indicating that a command is stored for execution (not shown).

After storing the appropriate event(s), the database controller enters a loop wherein it waits for the appropriate security panel(s) to establish a connection with the alarm receiver, as indicated by block 410. In the illustrated embodiment, the database controller waits for the alarm receiver to send a signal to the database controller indicating the connection is established. In an alternative embodiment, the database controller sends a signal to the alarm receiver to determine whether the connection is established after waiting for a predetermined amount of time. If the database controller determines that the appropriate security panel is not connected, it waits again for the predetermined time period.

In the illustrated embodiment, after the interface provider receives notification that the command request is pending, as indicated by block 408, the interface provider also enters loop to determine when the command is executed. As illustrated, the interface provider polls the database controller to determine whether the event indicative of the command request has been processed, indicated by block 412. If the event has not been processed, the interface provider polls the database controller again, as indicated by block 412. The interface provider continues to poll the database controller until the database controller indicates that the event indicative of the command request has been handled, as indicated by block 414. When this occurs, the interface provider causes a message to be displayed on the remote user terminal indicating that the appropriate security panel successfully executed the pending command request.

After the alarm receiver has determined that the appropriate security panel(s) have established a connection with the server, the alarm receiver enables the security panel(s) to access the database and to determine whether any events are pending in the event queue, as indicated by block 416. For each pending event, the security panel is configured to perform an action based on data about the event stored in the database. For each event, the security panel issues a response message indicating the event was successfully handled and indicating any necessary data, as indicated by block 418. In various embodiments, the response message includes additional data such as a time stamp; data indicative of a sensor state after providing said determined command request to said associated remotely located security panel; data indicative of an operating parameter such as a permission, schedule, access, or maintenance parameters; a status message; data indicative of the panel from which said response originated; or data indicative of a destination of said response. It should be appreciated that in various embodiments the response message received after an executed command request does not include security sensor-specific data—rather, in various embodiments, at least some of the data included in the response message relates to the security panel as a whole or to some subset of sensors, users, schedules, or other operating parameters of a building security system.

Upon receiving such a message, the alarm receiver is configured to send the received response message to the database controller, as indicated by block 420. The database controller parses the response message and stores it in the database to indicate that the event indicative of the command request was executed, as indicated by block 422. It should be appreciated that storage of a message indicating that that the command request has been executed, the interface provider's next poll of the database controller will indicate a successful execution of the command request, as indicated by block 414, and will result in the display of a success message on the remote user terminal. In various embodiments, the database controller is configured not to receive a response to a command sent to a security panel. In these embodiments, the interface provider does not indicate confirmation of a security sensor actuation, though in certain embodiments the interface provider is configured to indicate that the alarm receiver sent an appropriate command. It should be appreciated that the above steps, indicated by blocks 418, 420, and 422, are repeated for each event in the event queue to ensure that any pending events are appropriately handled when the proper security panel establishes a connection with the server disclosed herein.

Figure 5:
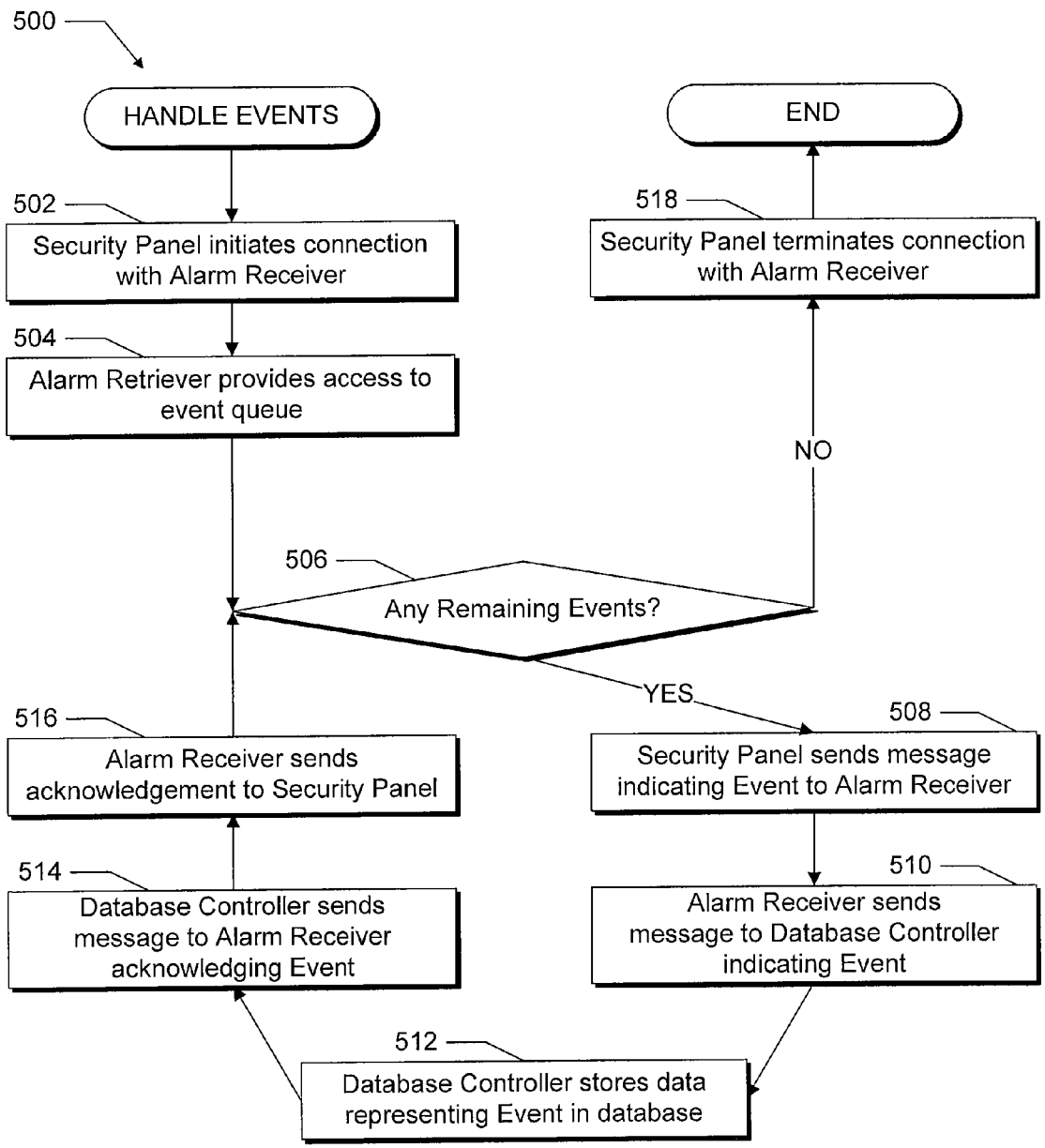
FIG. 5 is a flow chart of a process for establishing a connection with a remote security panel, handling a plurality of panel events, and disconnecting from the remote security panel.

FIG. 5 illustrates a flow chart of an example process 500 for handling a plurality of security events stored in an event queue of the system disclosed herein. Although the example process 500 for handling a plurality of security events is described with reference to the flow chart illustrated in FIG. 5, it should be appreciated that the system disclosed herein enables other processes for handling a plurality of events. For example, the order of many of the blocks may be changed, and many of the blocks described are optional.

As illustrated, the process 500 for handling a plurality of events begins when a security panel initiates a connection with the alarm receiver of the server 200, as indicated by block 502. It should be appreciated that for each command request received by the server from a remote user terminal, an event is generated and added to an event queue. This should be distinguished from a plurality of security condition changes detectable by the plurality of security panels, to be discussed below. An event is something indicated by an operator at a remote user terminal, while a security condition change is a condition detected by a remote security panel to be communicated to the server disclosed herein. As will be discussed below, when a security panel detects a security condition change, it establishes an immediate connection with the server to communicate the condition change. On the other hand, events are executed only when a security panel establishes one of a plurality of regularly scheduled or "check-in" sessions.

Upon establishing a check-in connection, the alarm receiver of the server disclosed herein enables the security panel to access and analyze each event in the event queue of the database representing a plurality of command requests, as indicated by block 504. The security panel then adds each command request to the event queue for execution.

After establishing the existence and contents of an event queue, the system begins an event handling loop defined by blocks 506, 508, 510, 512, 514, and 516 to appropriately handle each event in the event queue. First, the system determines whether there are any remaining events in the event queue of the remote security panel, as indicated by block 506. In one embodiment, remaining events include a plurality of command requests stored in the database. If an events remain in the event queue, the security panel handles the event and sends an appropriate message to the alarm receiver, as indicated by block 508. In one embodiment, such message includes data about at least one sensor connected to the remote security panel. In another embodiment, the message includes data indicative of the actuation of an actuatable security sensor.

In various embodiments, the alarm receiver forwards the received message to the database controller for storage, as indicated by block 510. In one embodiment, the database controller simply stores the data, as indicated by block 512. In another embodiment, wherein one or more users at one or more remote terminals generated a command request, the database controller forwards the received data to the interface provider for display to the remote user (not illustrated). Moreover, as illustrated in block 412 of FIG. 4, the next poll of the database controller indicates to the interface provider that the event is complete. In either embodiment, the database controller sends a message to the alarm receiver acknowledging receipt of the data indicative of the handled event, as illustrated by block 514. The alarm receiver sends a similar acknowledgement message to the security panel, indicating that the handled event has been acknowledged. In one embodiment, the database controller then removes the event from the event queue (not illustrated).

As further illustrated by FIG. 5, the system disclosed herein again determines whether any events remain in the event queue, as indicated by block 506. The system handles any remaining events as indicated by blocks 508, 510, 512, 514, and 516. Since a plurality of events are potentially handled for the same generated connection, it should be appreciated that the system minimizes the number of connections required to enable real-time or near real-time access to data of and execution of commands by a security panel.

If, after an event has been handled as described, no further events remain (i.e., if the event queue is empty), the security panel in one embodiment terminates the connection with the alarm receiver, as indicated by block 518, and ends the event handling process 500.

In various embodiments, the security panels of the panel access system are configured to sense a plurality of security condition changes that occur based on user input at the remote secured site. For example, if a user accessing a remote building utilizes a keypad or other input device to make a change to panel information, such as a schedule, the panel is configured to handle the sensed security condition change. In one embodiment, the panel handles the security condition change by immediately establishing a connection with the server and sending data indicative of the security condition change to the server. In another embodiment, the panel handles the security condition change by storing data indicative of the change on at least one memory device accessible by the panel, and upon the next establishment of a check-in connection, sending data indicative of the security condition change to the server. In either embodiment, it should be appreciated that such security condition changes are handled separately and apart from any events in the event queue.

In various embodiments, the panel access system disclosed herein includes a firewall to monitor any incoming data. In one embodiment, the at least one microprocessor is configured to execute a plurality of instructions stored on the at least one memory device to implement a software firewall. In a further embodiment, the interface provider includes a firewall such that any data received by the interface provider is analyzed for authenticity and maliciousness. Moreover, in this embodiment, the interface provider is configured to validated the source of each received message based on the login information received at the initiation of a connection to a user terminal. In another such embodiment, the microprocessor is configured to co-act with the memory device and the network interface device to implement a separate firewall configured to monitor incoming network traffic to any of the components of the system for validity.

In various embodiments, messages transmitted between the alarm receiver and a remote security panel are transmitted using an appropriate Internet protocol. In one such embodiment, messages are transferred using known Internet protocols such as TCP or UDP. In another embodiment, the alarm receiver is configured to send and receive messages using a protocol developed specifically to enable communication between a microprocessor and a plurality of remote security panels. In these embodiments, the transfer protocol defines the structure of each individual message as well as the sequence of messages necessary to perform various tasks, such as to establish a connection, to maintain a connection, and to terminate a connection. The protocol for enabling message transfer between the alarm receiver and the remote security panels enables the system to communicate with a plurality of remote security panels without direct hardware connection between the server and the security panels (e.g., additional network cabling).

In various embodiments, any messages transferred between the alarm receiver and a remote building security panel are structured according to a security panel-specific protocol. In one embodiment, this panel-specific protocol is based on the TCP protocol to enable easy transfer over the Internet. In another embodiment, the protocol is a simplified protocol to enable fast and easy transfer of any necessary messages between the remote security panel and the alarm receiver. In either case, any messages sent are encrypted or are otherwise encoded to prevent malicious interception and use of the data contained within the messages.

In one embodiment, the server disclosed herein monitors security sensors for a plurality of secured buildings by communicating with one or more security panels of each secured building. As discussed below, in one embodiment each secured building is referred to as a "site." Moreover, a site as discussed below can include a plurality of security panels, wherein each security panel defines one or more distinct "areas" within the "site." In various embodiments, it is useful to a security operator to refer secured portions of buildings as "areas" and "sites," such as for a commercial office building having a plurality of businesses, each business with its own security system. In such an embodiment, the commercial office building can be referred to as a "site," and the space occupied by each business of the office building can be referred to as an "area" of the "site."

In the embodiments illustrated by the screen shots of FIGS. 6 to 22, reference is made to users and to operators. It should be appreciated that as referenced below, a user is an individual to whom a security sensor is configured to grant access to a secured building. For instance, the employees of a company in a secured building can be users. An operator is an individual responsible for maintaining a plurality of security sensors of a plurality of buildings. In various embodiments, the operator manages the set of users having access to a building, runs reports, updates schedules, creates rules, and implements schedules as discussed below. In one embodiment, an operator provides a user with a mechanism to access a secured building. For instance, an operator may provide a user with an identification card or a user-specific code to enable a user actuate a security sensor to gain access to a secured building. It should thus be appreciated that the screen shots of FIGS. 6 to 22 represent interfaces provided to the operator of a security system and enable the operator to remotely monitor a the interaction of a plurality of users with a plurality of security sensors.

Figure 6:
FIG. 6 is a screen shot illustrating an example embodiment of the user interface presented by the interface provider of the remote panel access system disclosed herein summarizing remote event access about sensor state data.

FIG. 6 illustrates a sample screen shot 600 of an interface for displaying a real-time summary of a plurality of monitored security activities. As illustrated in FIG. 6, the interface provider a causes screen 600 to be displayed and to indicate a summary of door access events 602 for each security panel monitored by the remote access system. It should be appreciated that in the illustrated embodiment, each door access event is indicated by a change in state of a door security sensor connected to a remote security panel. The screen 600 indicates the 25 most recent door access events 604 detected by the security panel of any of the plurality of buildings connected to the server, and also provides an option to filter the events by site or area 606. Further, the screen 600 includes a site summary section 608 for displaying a list of the sites connected to the server as well as the plurality of areas of each site. In one embodiment, each site and area of the summary section 608 is selectable, which enables an operator to quickly filter the results by site or area.

Figure 7:
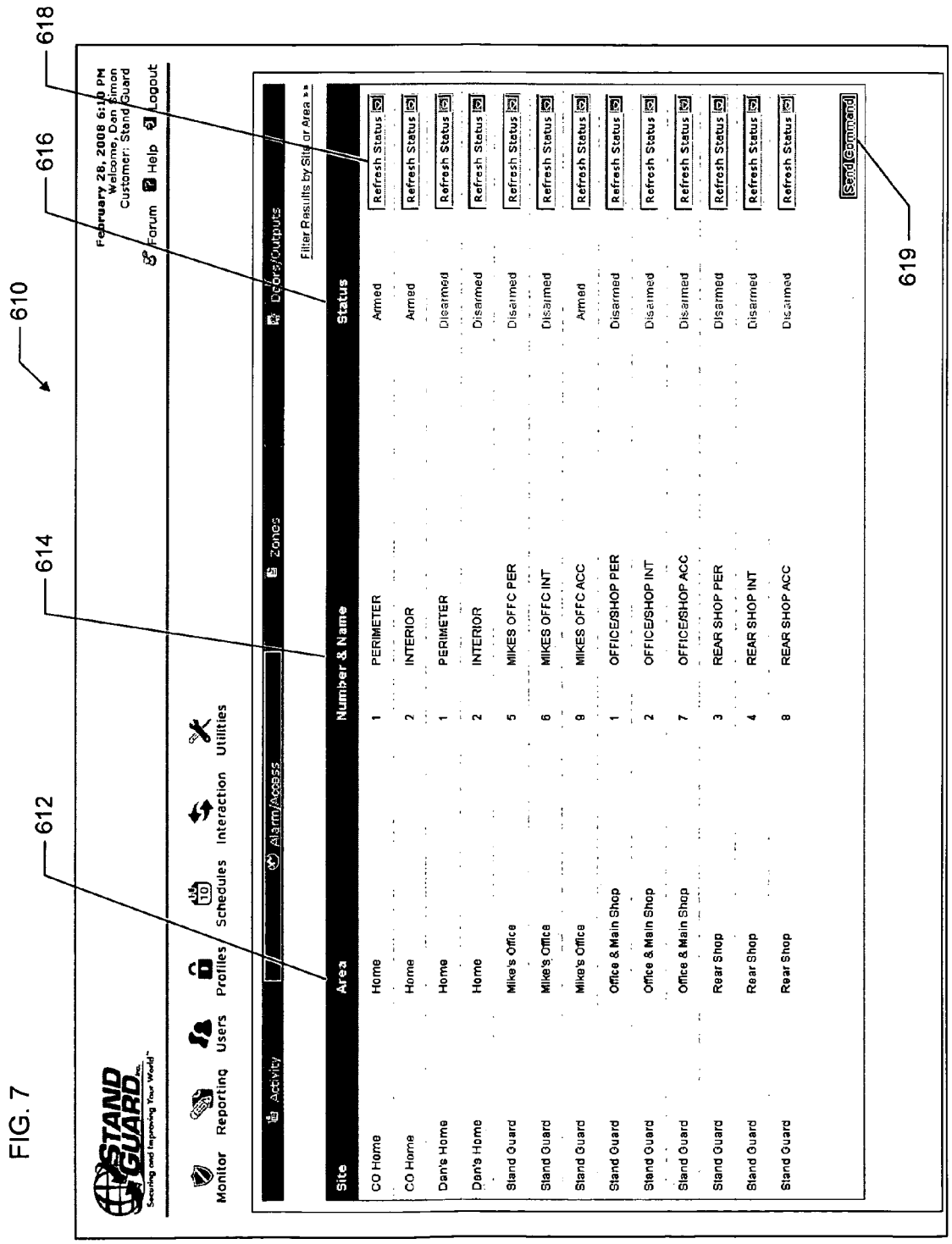
FIG. 7 is a screen shot illustrating an example embodiment of the user interface presented by the interface provider of the remote panel access system disclosed herein summarizing security sensor grouping data arranged by sensor site and area.

FIG. 7 illustrates a sample screen shot 610 indicating a summary of data about the state of each security sensor connected to a plurality of security panels. Screen 610 includes data indicating the site and area of each security sensor 612. Moreover, screen 610 includes a number and name associated with each security sensor 614, as well as a status value 616 for indicating the state of each security sensor. Finally, screen 610 includes a pull-down menu 618 for each security sensor to enable an operator to request state data from or issue a command to each security sensor. In the illustrated embodiment, the displayed pull-down menu includes a refresh status option. In this embodiment, selecting the refresh status option from the pull-down menu 618 and selecting the Send Command button 619 causes the database controller to determine whether a more recent value has been downloaded to the database. If no more recent value has been downloaded, the database controller generates a command request indicating the desired data such that upon the next connection by the appropriate security panel, the requested refreshed status data is downloaded. Similarly, selecting a command from the pull-down menu 618 causes the database controller to generate and appropriate command request for execution by a security panel.

FIG. 8 illustrates a sample screen shot 620 indicating a summary of state data of a plurality of security sensors similar to the data displayed in FIG. 7 above. It should be appreciated that screen 620 of FIG. 8 indicates security sensor data filtered by zone 622. Thus, screen 620 indicates the site, area, number and name, and status of each security sensor of the plurality of buildings monitored by the server. Moreover, screen 620 indicates that the site 624 of each security sensor shown is identical, since each sensor is in the same zone, which by definition means they are at the same site. Screen 620 also enables an operator to request state data and issue commands to the displayed security sensors.

Figure 9:
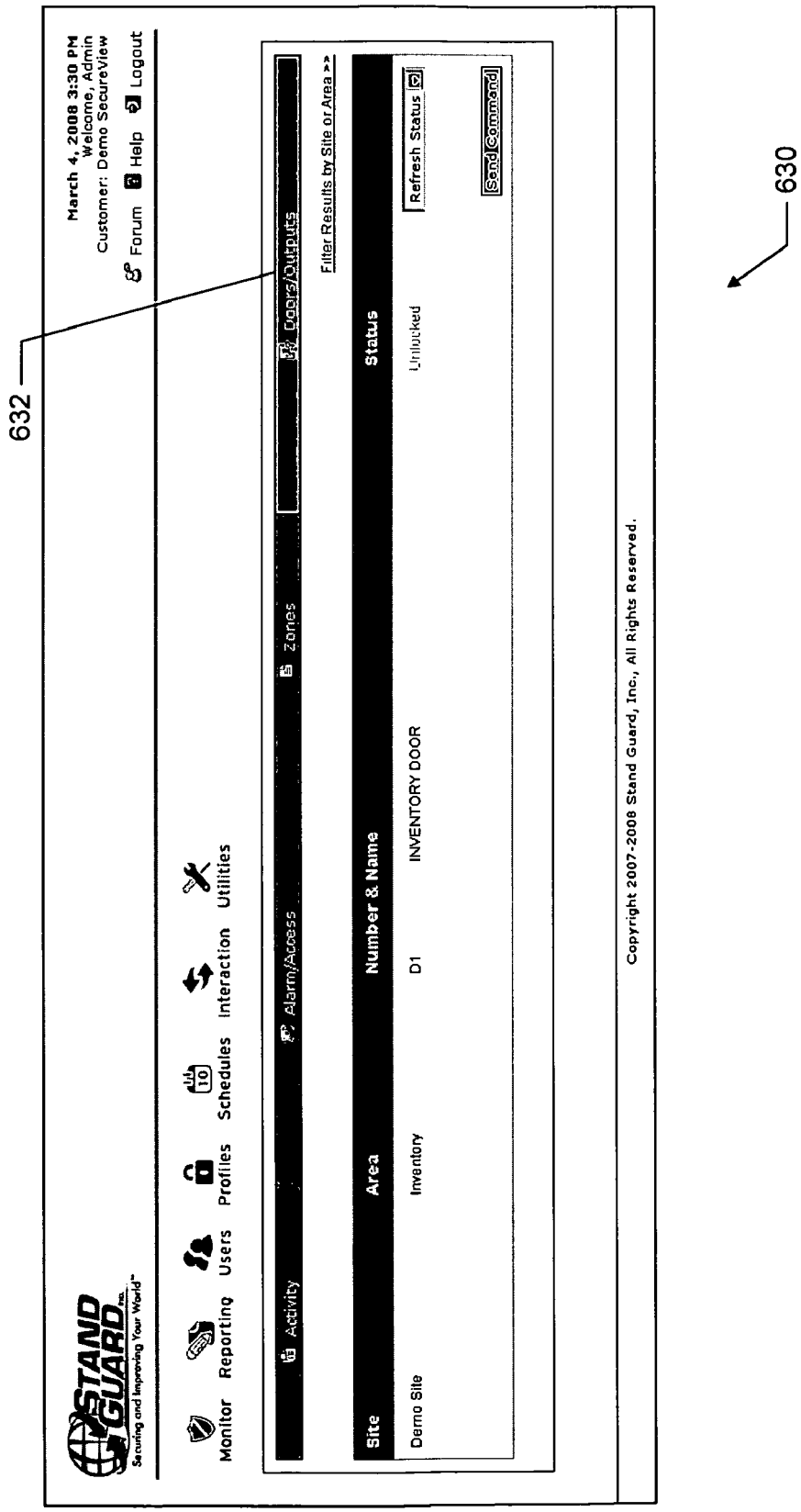
FIG. 9 is a screen shot illustrating an example embodiment of the user interface presented by the interface provider of the remote panel access system disclosed herein indicating security sensor state data for a single door lock actuator.

FIG. 9 illustrates a sample screen shot 630 indicating data about any security sensors arranged by security sensors configured to sense a door/output, as indicated by 632. In the illustrated embodiment, a single security sensor is configured to sense the state of a door/output. In the illustrated embodiment, the door is an INVENTORY DOOR at the Demo Site. The information displayed by screen shot 630 is similar to the information displayed by screens 610 and 620 above, including the displayed pull-down menu to enable an operator to send a command to or request data about a security sensor. It should be appreciated that screen 630 is filtered to only show data about the state of a security sensor of a door or output.

It should be appreciated that the system disclosed herein enables efficient and simultaneous monitoring and control of a plurality sensors connected to a plurality of remote security panels. By providing an interface to enable an operator to remotely view near real-time data about the security panels of a plurality of buildings, the remote panel access system enables an operator to accurately and efficiently monitor a plurality of buildings without disconnecting from the security panel of one building and re-establishing a new connection with a security panel of another building. Moreover, by providing real time access to the data as illustrated, the panel access system enables an operator to filter security information by secured building, areas within a single secured building, or type of sensor. The system also enables an operator to arm or disarm areas, bypass zones, or lock or unlock doors of a plurality of secured buildings without breaking or re-establishing any remote connections. Such operations are performed by simply selecting a menu option from a pull-down menu and selecting a Send Command button.

Figure 10:
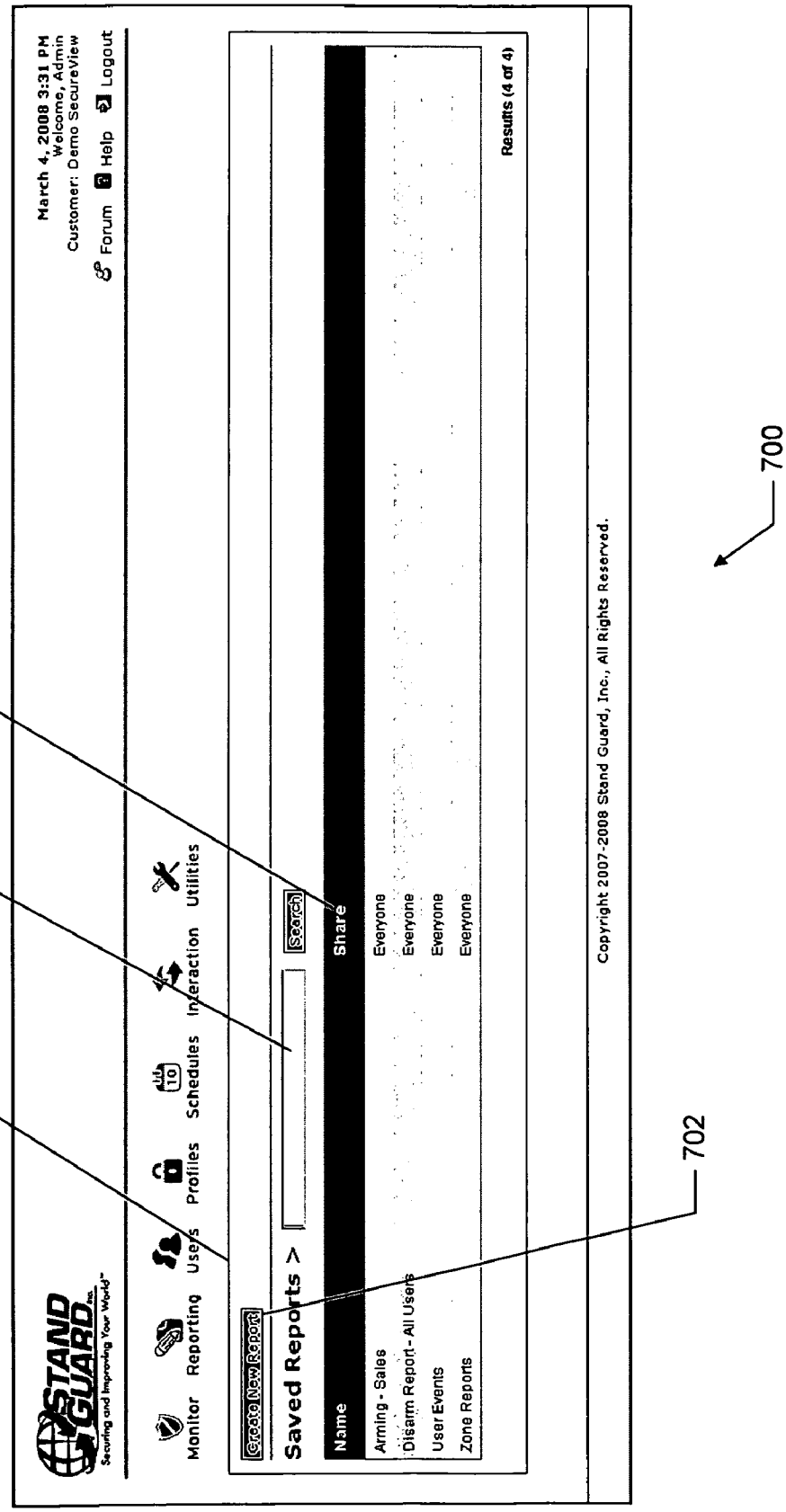
FIG. 10 is a screen shot illustrating an example embodiment of the user interface presented by the interface provider of the remote panel access system disclosed herein indicating a plurality of saved reports.

FIG. 10 illustrates a sample screen shot 700 of a list of reports saved by the system disclosed herein. In one embodiment, the reports are saved in the database and managed by the database controller. The list of saved reports includes a report name 702 and a share status 704 indicating the audience having access to the data contained in the report. Moreover, screen 700 provides a mechanism 706 to enable an operator to search the saved reports. Finally, the screen 700 provides a button 708 which, when selected, causes the system to create and save a new report.

Figure 11:
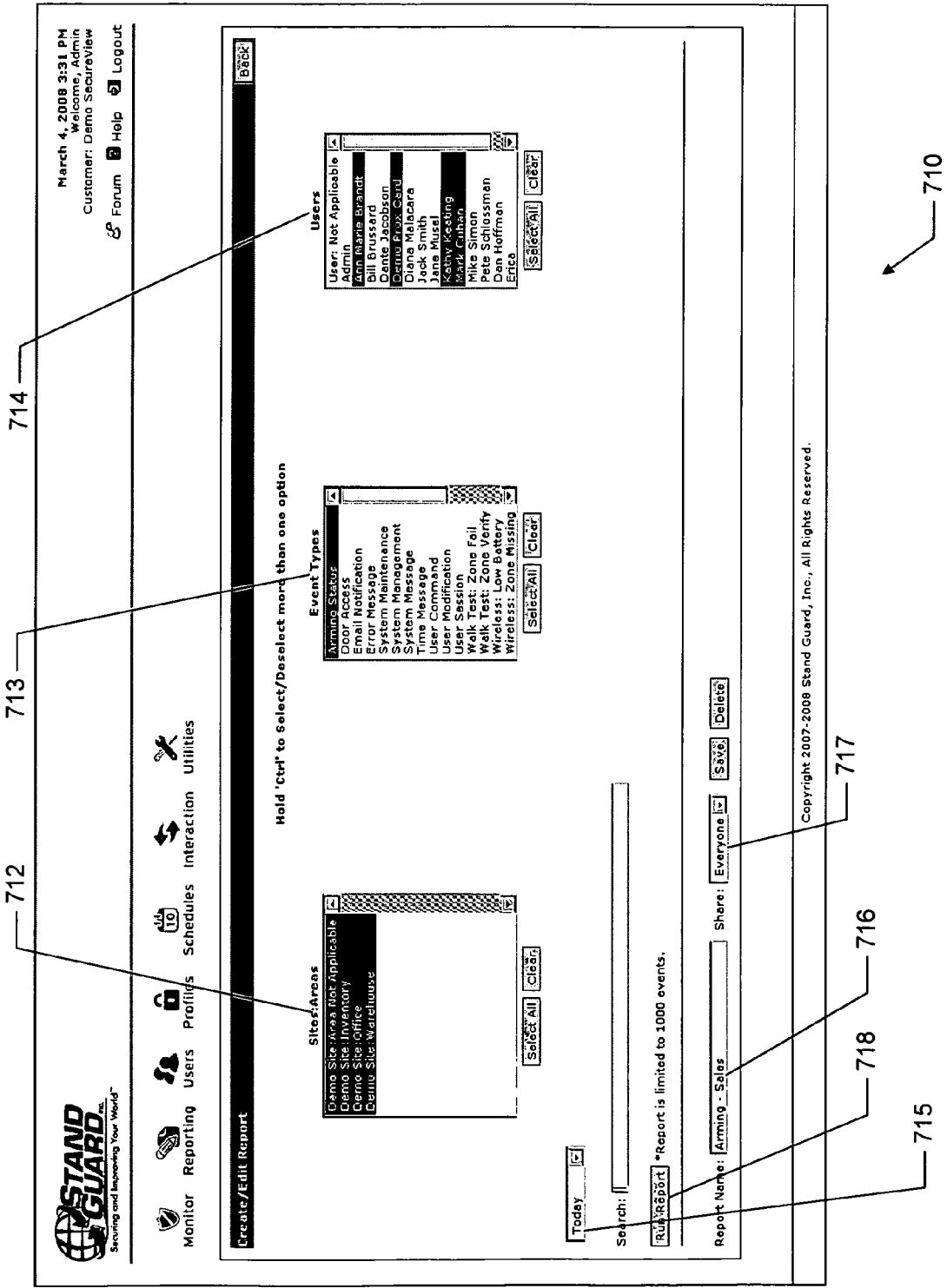
FIG. 11 is a screen shot illustrating an example embodiment of the user interface presented by the interface provider of the remote panel access system disclosed herein enabling an operator to define or edit a report.

FIG. 11 illustrates a screen 710 displayed by the system to enable an operator to create or edit a report. As illustrated, the displayed screen 710 includes a menu of selectable sites and areas 712 such that an operator can define the set of sensors about which the report will contain data. The screen 710 also displays a menu of monitored event types 713 indicating security sensor states included in the report, and a menu of users 714 indicating the user of a secured building that caused the indicated security sensor state in the indicated building. Moreover, the screen 710 includes a pull-down menu 715 to enable an operator to indicate the time-frame of the report to be run. The system in the illustrated embodiment stores a report name 716 and a share value 717 about each created report to enable easy searching of reports as illustrated in FIG. 10. Upon an operator selecting a Run Report button 718, the database controller discussed above performs a plurality of database queries to retrieve any data that satisfies the criteria defining the report.

FIG. 12 illustrates a screen shot 720 indicating the contents of a report run by the system. In the illustrated embodiment, the report includes data about a plurality of monitored events 722, wherein each monitored event represents a security sensor state satisfying the criteria of the report. The screen 720 includes data about the date and time of each, the site of each monitored event, the area of each monitored event (if applicable), the monitored event type, the user generating each monitored event, and a description of each monitored event. It should be appreciated that, as illustrated by numeral 724, the system enables the reports to be sorted by each of the aforementioned categories of data indicative of monitored security activity.

As illustrated in FIGS. 10, 11, and 12, various embodiments of the system disclosed herein enable efficient reporting. Rather than connecting to and disconnecting from the security panel of each secured building to run reports for a plurality of buildings, the system generates reports including data about a plurality of security sensors of a plurality of buildings. Moreover, such reports do not require connection to any building security panels—they are merely populated with historical, near real-time data stored in the database. The system also generates customized reports not possible without the server disclosed herein. For instance, the server facilitates searching data about sensors connected to a plurality of security panels, which enables reports based on secured area, based on the type of monitored security activity, based on a user accessing a plurality of buildings, based on a search string, or based on a timeframe for the report. Reports generated by the system are thus not limited data about sensors connected to a single security panel. Moreover, the database controller in one embodiment is configured to store a set of criteria defining a desired report and to re-run the report based on the criteria. Thus, the system enables efficient execution of a plurality of reports based on a predefined set of criteria.

The system also advantageously runs reports without connecting to a security panel. As discussed above, the alarm receiver enables automatically downloading of sensor state data from a plurality of secured buildings on a regular basis. Since the data is stored in the database of the system, the database controller is configured to run reports, store reports, and cause reports to be displayed to at a remote terminal based on data stored in the database. It should be appreciated that such reports are generated more quickly and more securely than reports generated from data retrieved directly from a sensor over the Internet. The database controller saves time by querying the database as opposed to establishing a network connection, and the report is more secure because establishing fewer network connections exposes security panels to the risk of unwanted electronic access less frequently.

Figure 13:
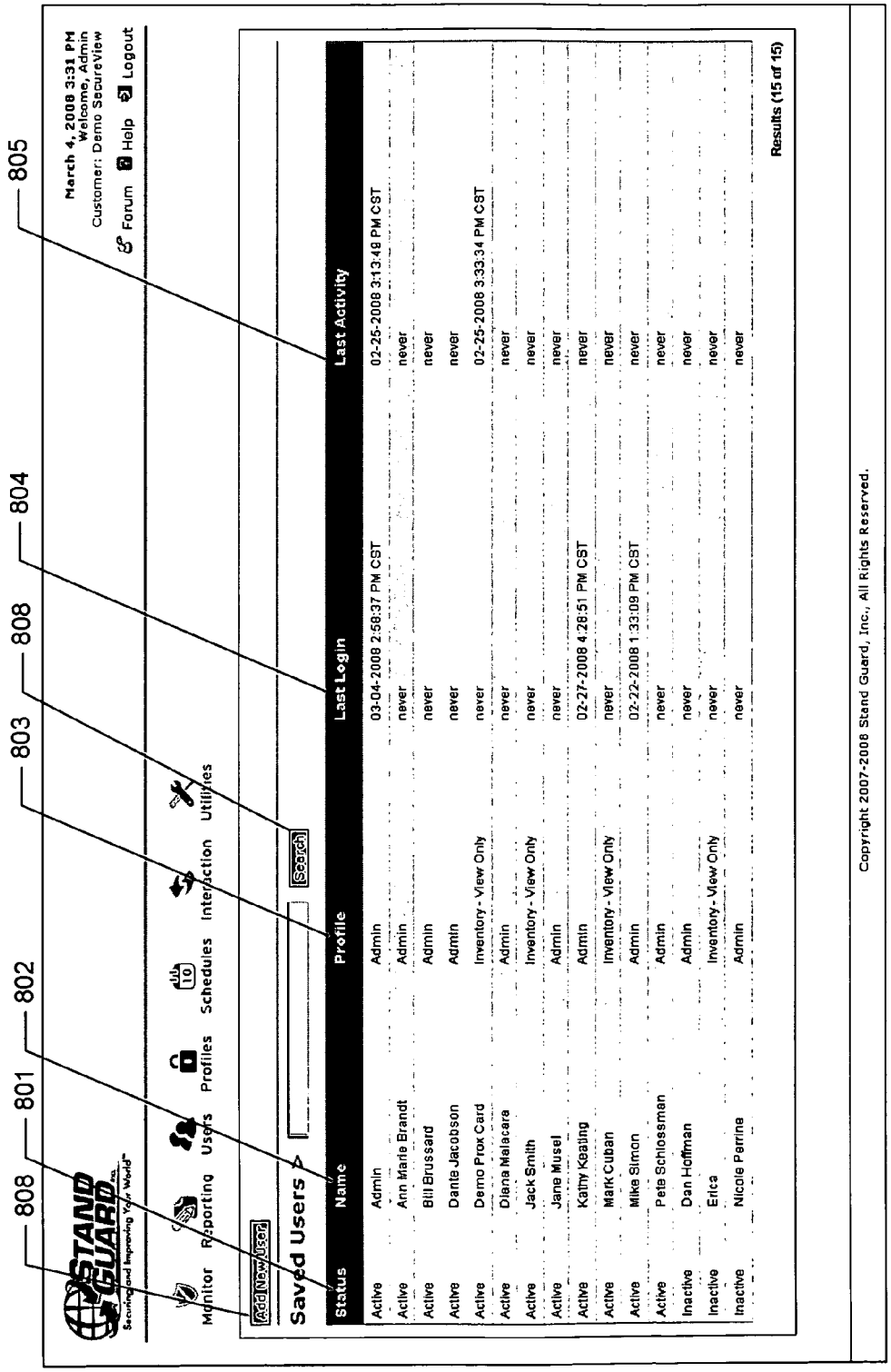
FIG. 13 is a screen shot illustrating an example embodiment of the user interface presented by the interface provider of the remote panel access system disclosed herein summarizing a plurality of stored users.

FIG. 13 illustrates a sample screen shot 800 indicating data about a plurality of security operators having permission to access the system. It should be appreciated that each operator is referred to as a user in the example embodiment illustrated in screen 800. As illustrated, the system stores a plurality of data about each operator, such as status, 801, name 802, profile type 803, last login 804, and last activity 805. In the illustrated embodiment, the system also causes a button to be displayed which, when selected, enables a new operator to be added 806. Moreover, the screen 800 includes an input area 808 to enable a search to be performed for saved operators.

Figure 14:
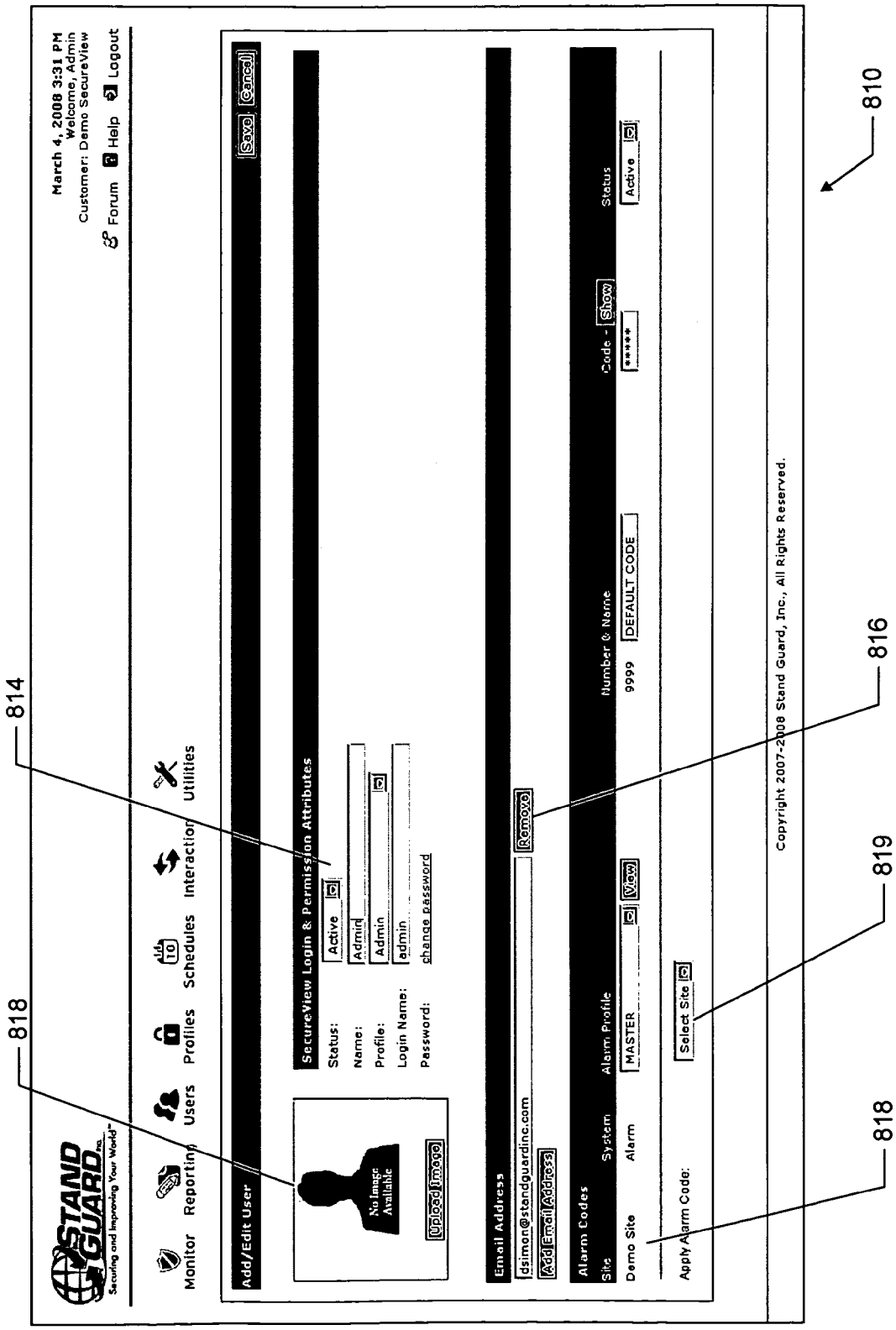
FIG. 14 is a screen shot illustrating an example embodiment of the user interface presented by the interface provider of the remote panel access system disclosed herein for enabling an operator to add or edit a user.

FIG. 14 illustrates a sample screen shot 810 of an add/edit user screen provided by the system. As illustrated, the system enables an operator to upload a photo 812, edit login and permission information 814, enter an email address 816, and create an alarm code 818 based on a profile, as discussed below, to enable the operator to create command requests to be executed by a remote security panel. It should be appreciated that each alarm code enabled by the system enables access according to permissions defined in one or more alarm profiles, discussed below. The screen 810 also includes a pull-down menu 819 to enable an operator to indicate a site to which to apply the entered alarm code.

Figure 15:
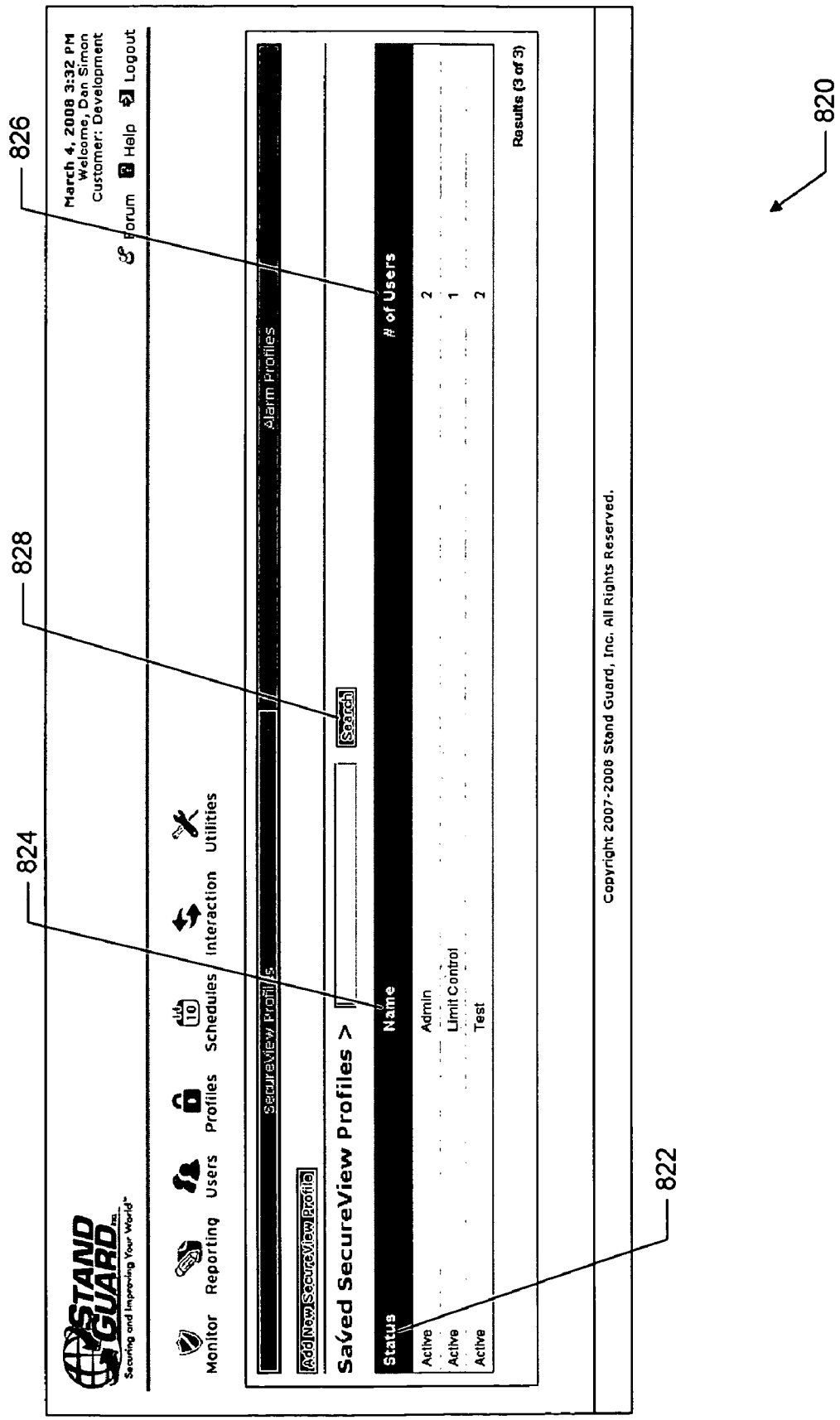
FIG. 15 is a screen shot illustrating an example embodiment of the user interface presented by the interface provider of the remote panel access system disclosed herein summarizing a plurality of stored profiles.

FIG. 15 illustrates a sample screen shot 820 of a profile summary display screen. In the illustrated embodiment, the screen 820 includes summaries of a plurality of profiles stored in the database of the system, including information about the status of the profile 822, the name of the profile 824, and the number of users associated with the profile 826. The screen 820 also provides an operator a mechanism 828 to search the database of profiles based on a textual input.

Figure 16:
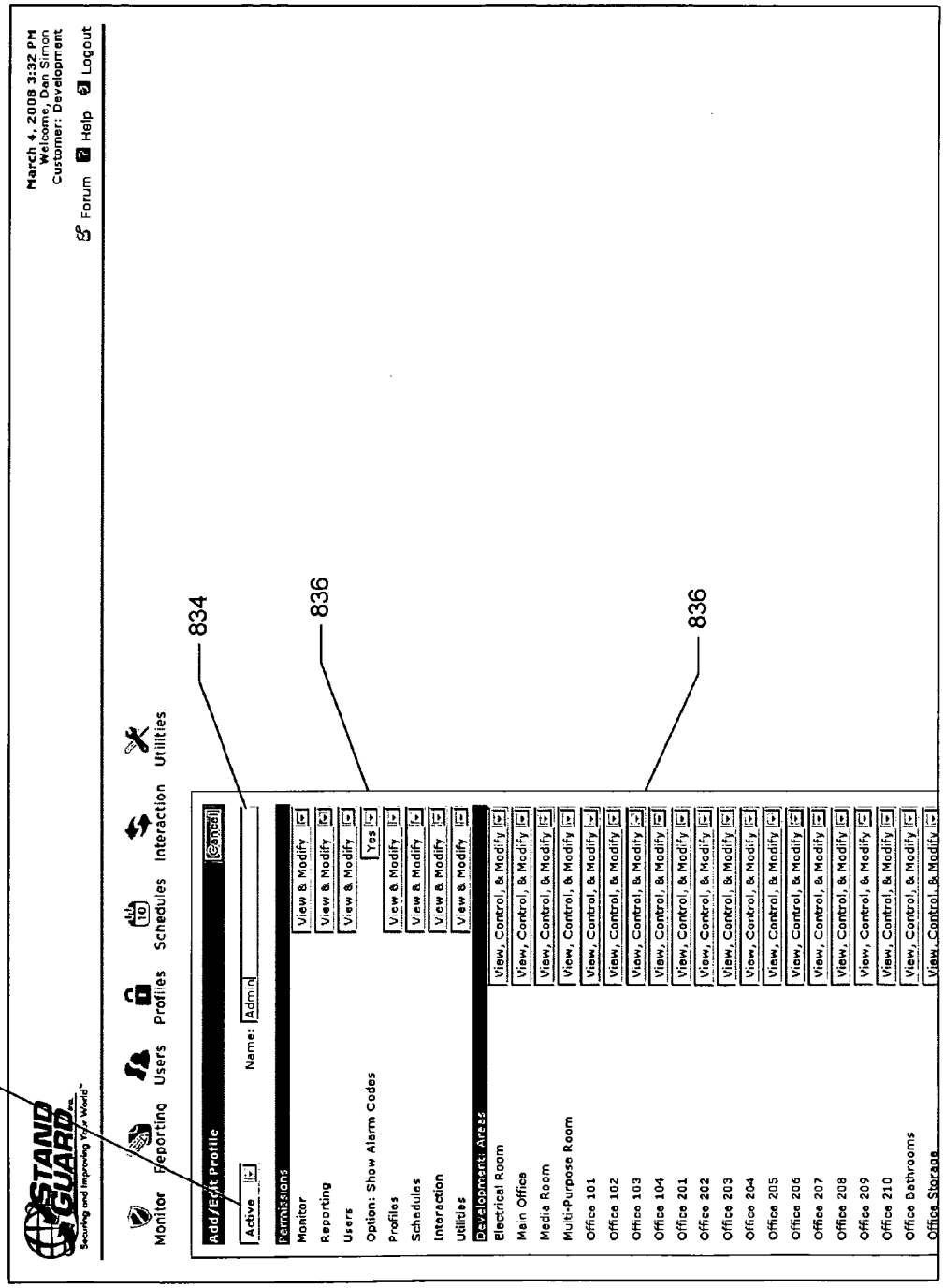
FIG. 16 is a screen shot illustrating an example embodiment of the user interface presented by the interface provider of the remote panel access system disclosed herein for enabling an operator to add or edit a profile to control a plurality of remote login permissions for a plurality of operators.

FIG. 16 illustrates a sample screen shot 830 of an add/edit profile screen. The illustrated screen enables an operator to define properties about a plurality of profiles and save the profiles in the database. The profiles editable using a screen such as screen 830 are profiles of remote security operators. Thus, the system enables an operator to define a plurality of tasks performable and a plurality of secured areas viewable by an operator logging in via a remote user terminal. For example, an operator can indicate whether a profile is to be currently active or inactive 832 and the name of a profile 834. Moreover, the system provides an operator an opportunity to define a plurality of permissions associated with the profile 836. Each profile defines permissions for various activities performed using the system. For example, depending on the configuration of a profile, certain operators are may or may not be given the permission to modify reporting features, scheduling features, or interaction features of the system. Finally, the screen 830 enables an operator to edit permissions to various areas of a secured building, as indicated by 838.

Figure 17:
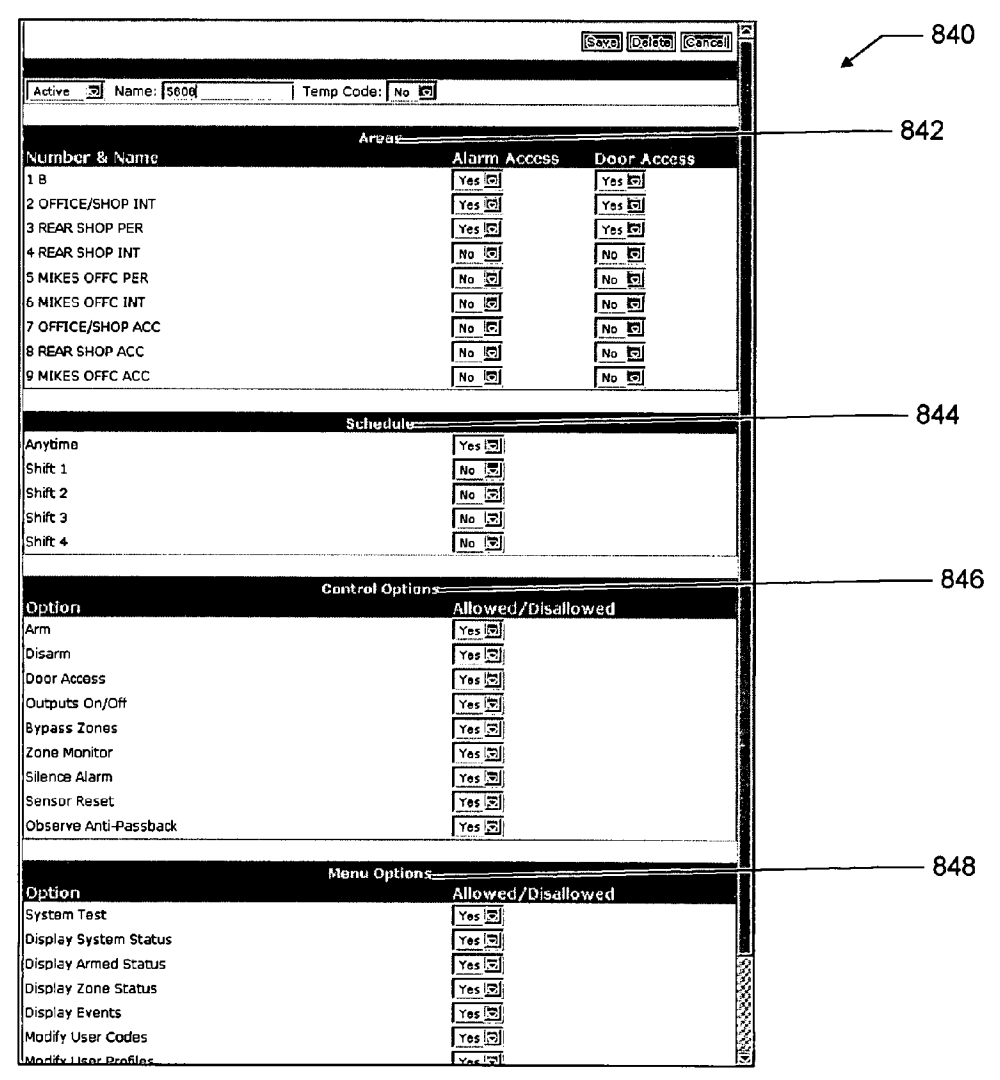

FIG. 17 illustrates a sample screen shot 840 of an alarm profile update screen. The illustrated screen enables an operator to define whether a particular alarm profile grants physical access to various areas of a secured building, the schedule during which access is granted, and the control options and menu options available to a user. It should be appreciated that in contrast to the screen 830 illustrated in FIG. 16, the screen 840 indicates a profile defining a particular user's physical access to a secured building. As illustrated, the system enables an operator to indicate the areas of the security system 842 to which the profile grants access. A plurality of areas are displayed, and for each area the system enables an operator to select an alarm access value and a door access value. The screen 840 thus enables an operator to control access granted by the profile based on area. Moreover, the system enables an operator to define access by schedule 844, such that for a certain shift a particular profile grants or denies access to a plurality of security sensors. The screen 840 also enables an operator to define the control options 846 associated with a profile. As illustrated, the control options include defining an ability to arm, disarm, access doors, or perform other security tasks. Finally, the definable profile enables an operator to customize the menu options 848 displayed to an operator with whom the profile is associated.

It should be appreciated that the system disclosed herein increases the efficiency with which a security operator can manage security sensors of a plurality of secured buildings. In various embodiments, the user control features illustrated in FIGS. 13, 14, 15, 16, and 17 enable an operator to define a plurality of system profiles, each profile granting a series of privileges and implementing a series of preferences with respect to the sensors of the security system. The panel access system is configured to store profile data about a plurality of users in the database and to upload the data as a background task when the appropriate security panel establishes a connection with the server. The system is thus configured to update user privileges on a system-wide basis, rather than requiring a security operator to remotely login to the security panel of each secured building and repetitively enter user information about the same set of users.

Further, by modifying and creating profiles as enabled by the system, an operator can limit remote access on an operator-by-operator or a user-by-user basis to certain areas of a security system. Thus, if a secured building contains multiple tenants, wherein each tenant maintains a separate area of a security system, the profiles enabled by the system cause the an operator a single tenant's security system to see only the security sensor data associated with the tenant's area of the building, and to manage user access only to the tenant's area of the building. Similarly, an appropriately-defined profile can cause users to be limited in their physical access to a building based on a plurality of factors. This overcomes a disadvantage of current security systems wherein any operator is able to view all security sensors connected to a single security panel associated with a secured building upon logging in.

Figure 18:
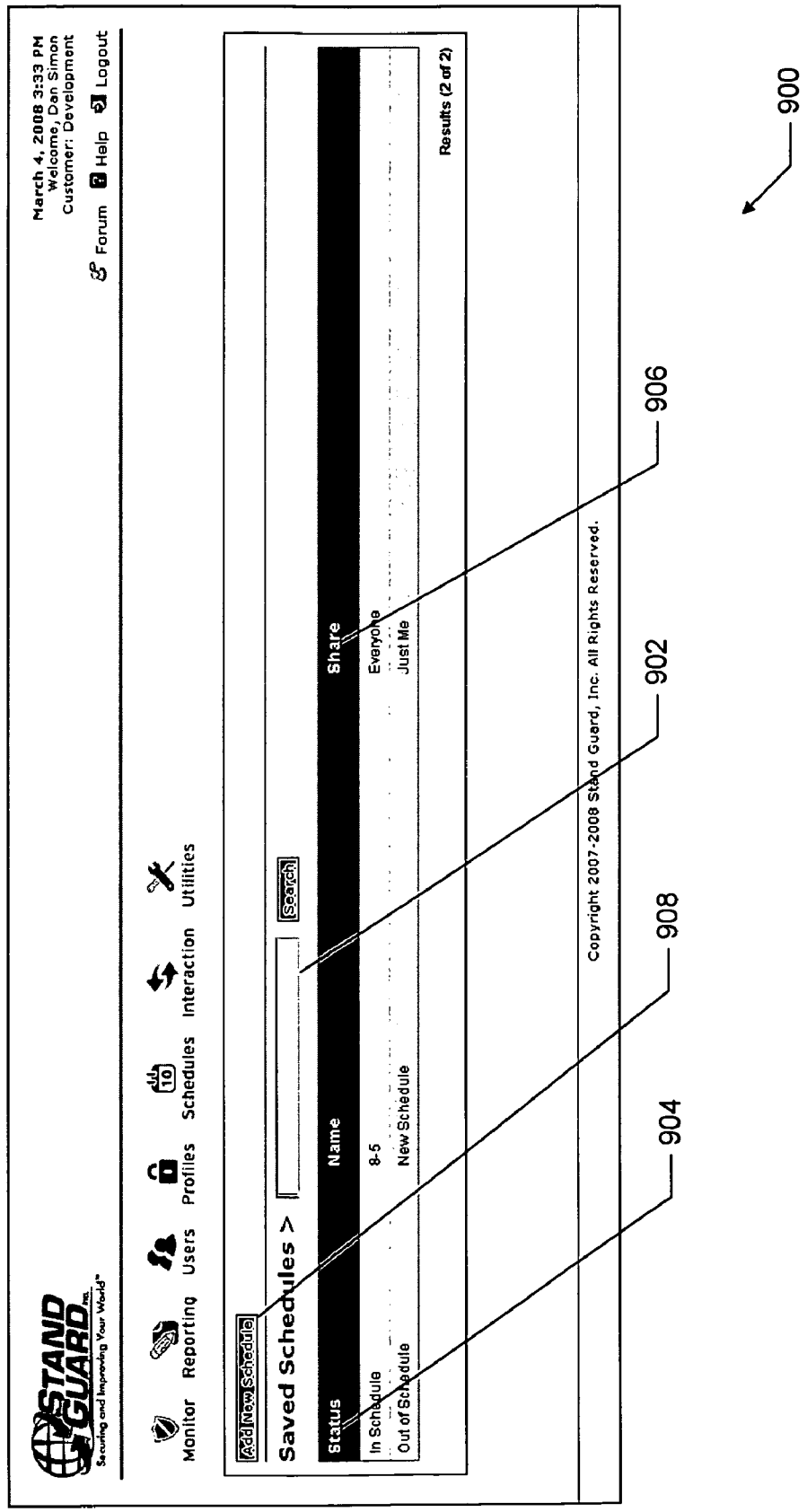
FIG. 18 is a screen shot illustrating an example embodiment of the user interface presented by the interface provider of the remote panel access system disclosed herein summarizing a plurality of saved schedules.

FIG. 18 illustrates an example screen shot 900 indicating a display of a summary of the schedules saved in the database discussed above. It should be appreciated that schedules enable an operator to configure shift times of user access and automatic door and output lock and unlock times about a plurality of sites. In the illustrated embodiment, the system enables an operator to search the saved schedules 902. The system causes the display of information about whether each retrieved schedule is currently operative 904 and about the sharing status of each schedule 906. Moreover, the system enables an operator to create and store a new schedule by selecting an Add New Schedule button 908.

Figure 19:
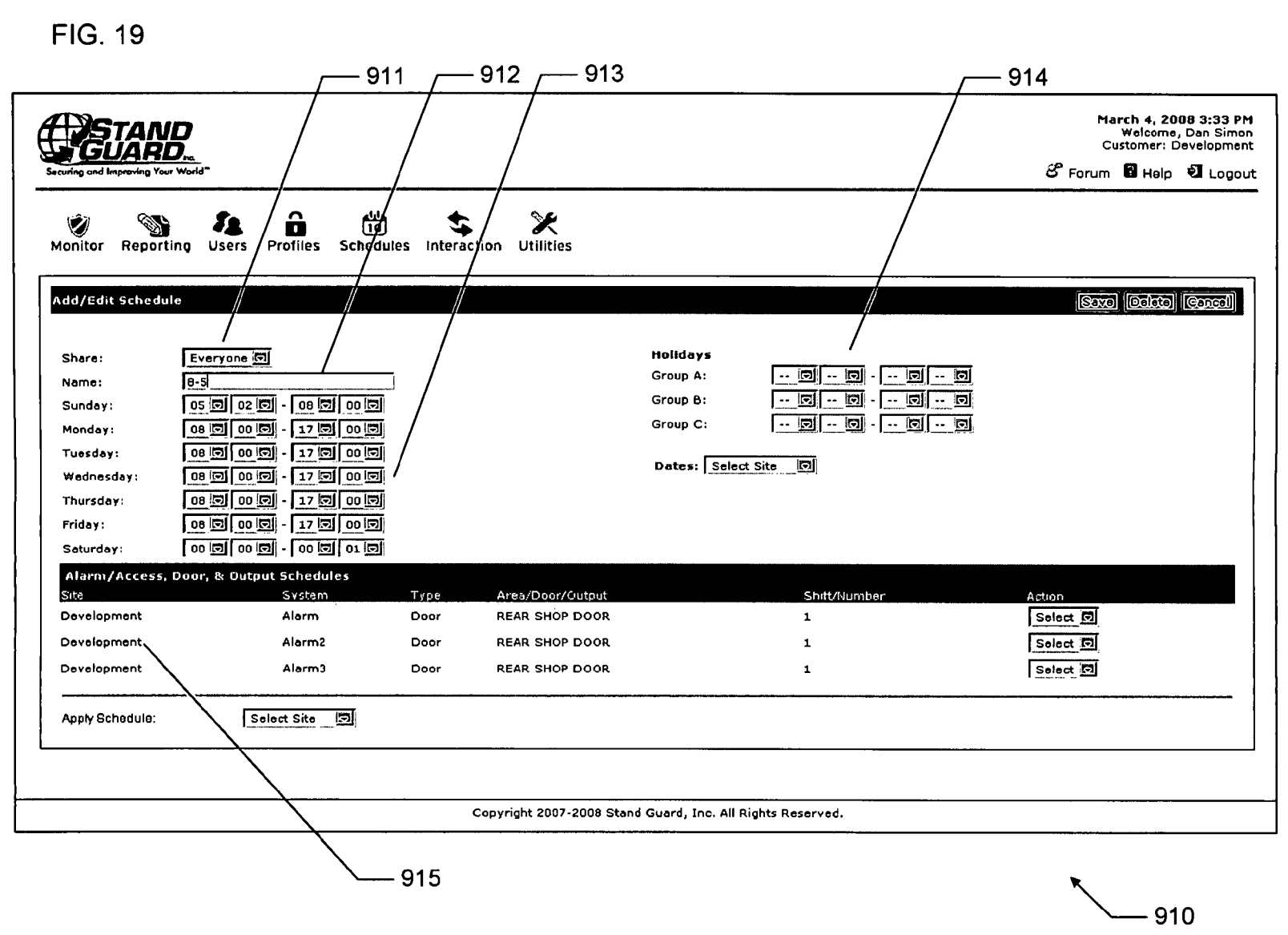

FIG. 19 illustrates an example screen shot 910 of an add/edit schedule screen. As illustrated, the system enables an operator to define a schedule by indicating a share value 911, a schedule name 912, and the times during a week 913 for which the schedule is operative. Moreover, the system enables an operator to define a plurality of holidays 914. Finally, the system enables an operator to define a plurality of commands to send and data to retrieve 915 about the security sensors of the of a plurality of buildings.

Figure 20:
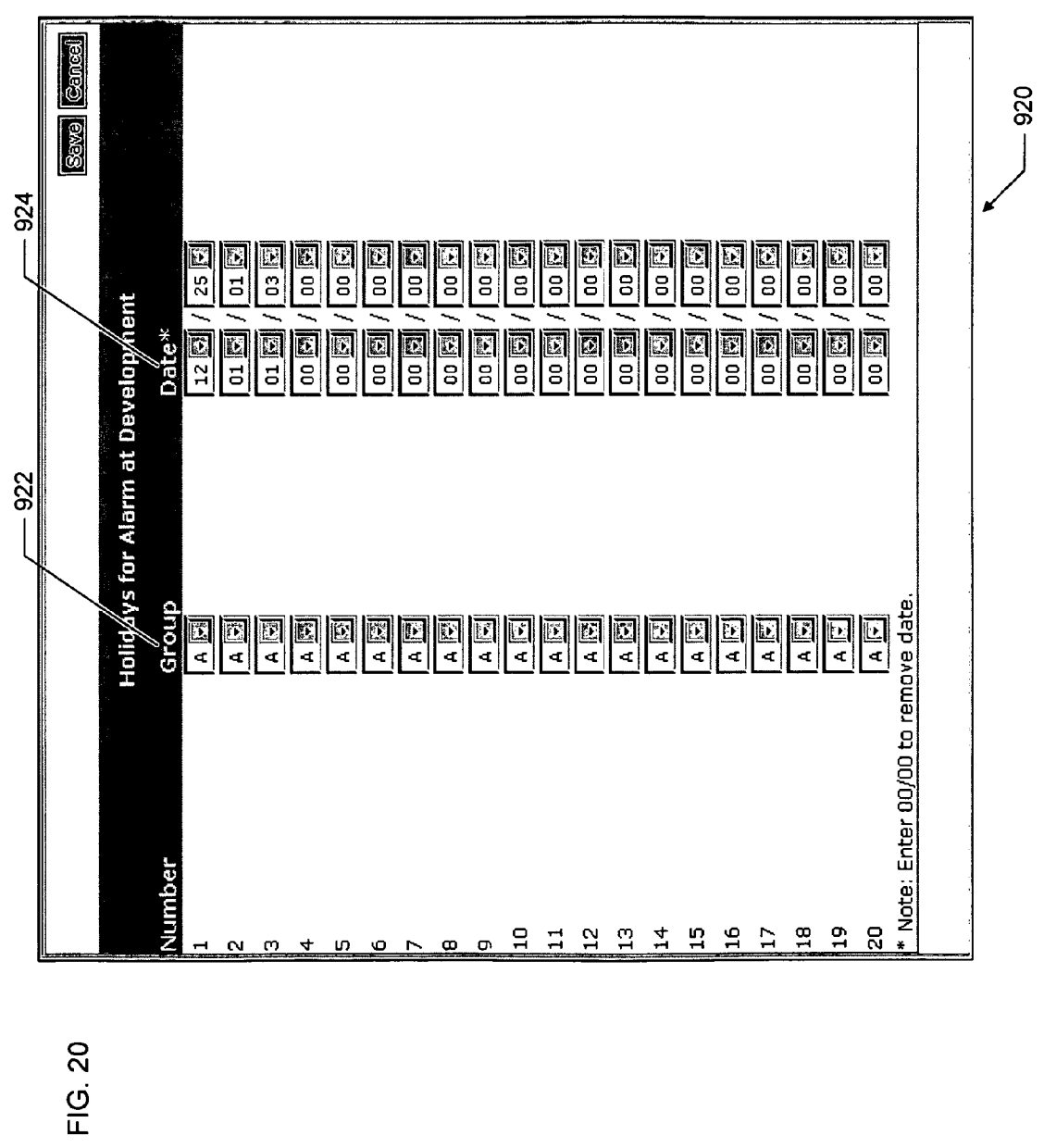

FIG. 20 illustrates a screen shot 920 for enabling an operator to define a plurality of holidays to further customize a plurality of schedules as discussed above. In the illustrated embodiment, the system enables an operator to define up to 20 holidays, wherein each holiday includes an associated group 922 and a date 924. By indicating a group with which the holiday is associated, it should be appreciated that different sets of holidays can easily be applied to different schedules, thus enabling further customization of a plurality of schedules.

The screens 900, 910, and 920 enable a security operator to efficiently define a plurality of schedules applicable to a plurality of secured buildings. In this embodiment, the interface provider enables an operator to input schedules and to define a plurality of areas of a plurality of secured buildings to which the schedules apply. In various embodiments, the schedules enable certain security sensors to be enabled or disabled based on the time of day, the day of the week, or whether a day is a defined holiday. As discussed above, the database controller is configured to automatically generate and store any command requests required to implement the operator-defined schedules on a plurality of security panels. When each alarm panel connects to the alarm receiver, the alarm receiver provides the command requests defined by the database controller to the security panel to update the security panel settings. Moreover, this updating process is performed as a background task, such that an operator does not need to manually change any settings in real-time on a security panel. It should be appreciated that the system thus saves a great deal of time and reduces the amount of operator interaction required to implement a plurality of complex schedules, applicable to different users of different secured buildings, including a plurality of holidays.

Figure 21:
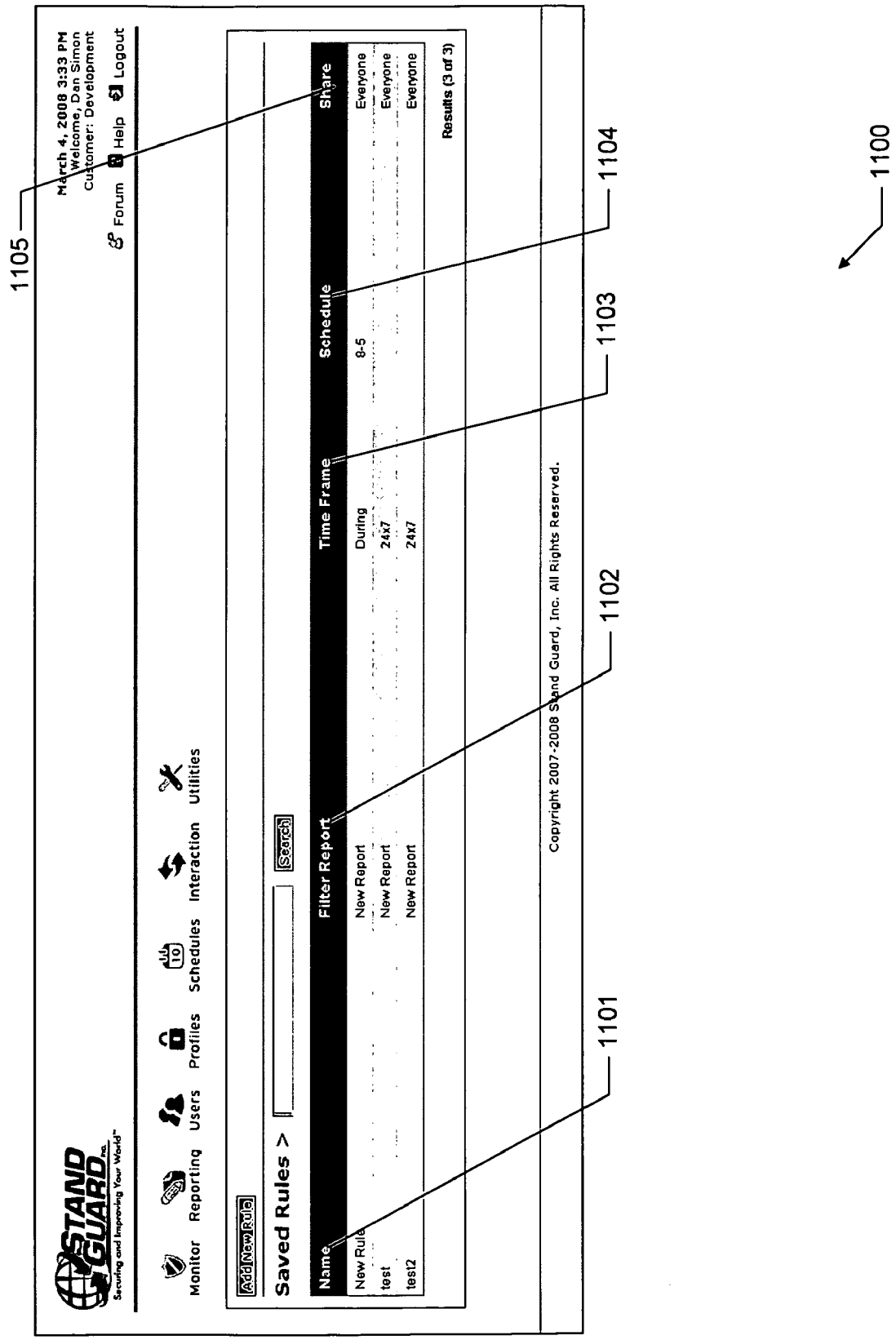
FIG. 21 is a screen shot illustrating an example embodiment of the user interface presented by the interface provider of the remote panel access system disclosed herein displaying a plurality of rules for sending electronic notification.

FIG. 21 illustrates an example screen shot 1100 indicating a plurality of saved rules defining a plurality of rules to cause the system to generate and send electronic notification messages. Each saved rule includes a name 1101, a filter report 1102, a time frame 1103, a schedule 1104, and a share value 1105. Since the satisfaction of the criteria of a rule results in an electronic message being sent, the filter report indicates a set of conditions, the satisfaction of which results in a message being sent. Moreover, the satisfaction of the conditions is based on the corresponding monitored security activity being received from an alarm panel. In one embodiment, a rule is configured to send electronic notification only about monitored security activities occurring during a predetermined time-frame. In another embodiment, rules cause the system to send electronic notification about monitored security activities occurring anytime. In the event that a rule is applicable only during a predefined time-frame, the screen 1100 displays the a name of a schedule associated with the rule. Finally, each rule includes a share value indicating the list of users having access to the rule.

Figure 22:
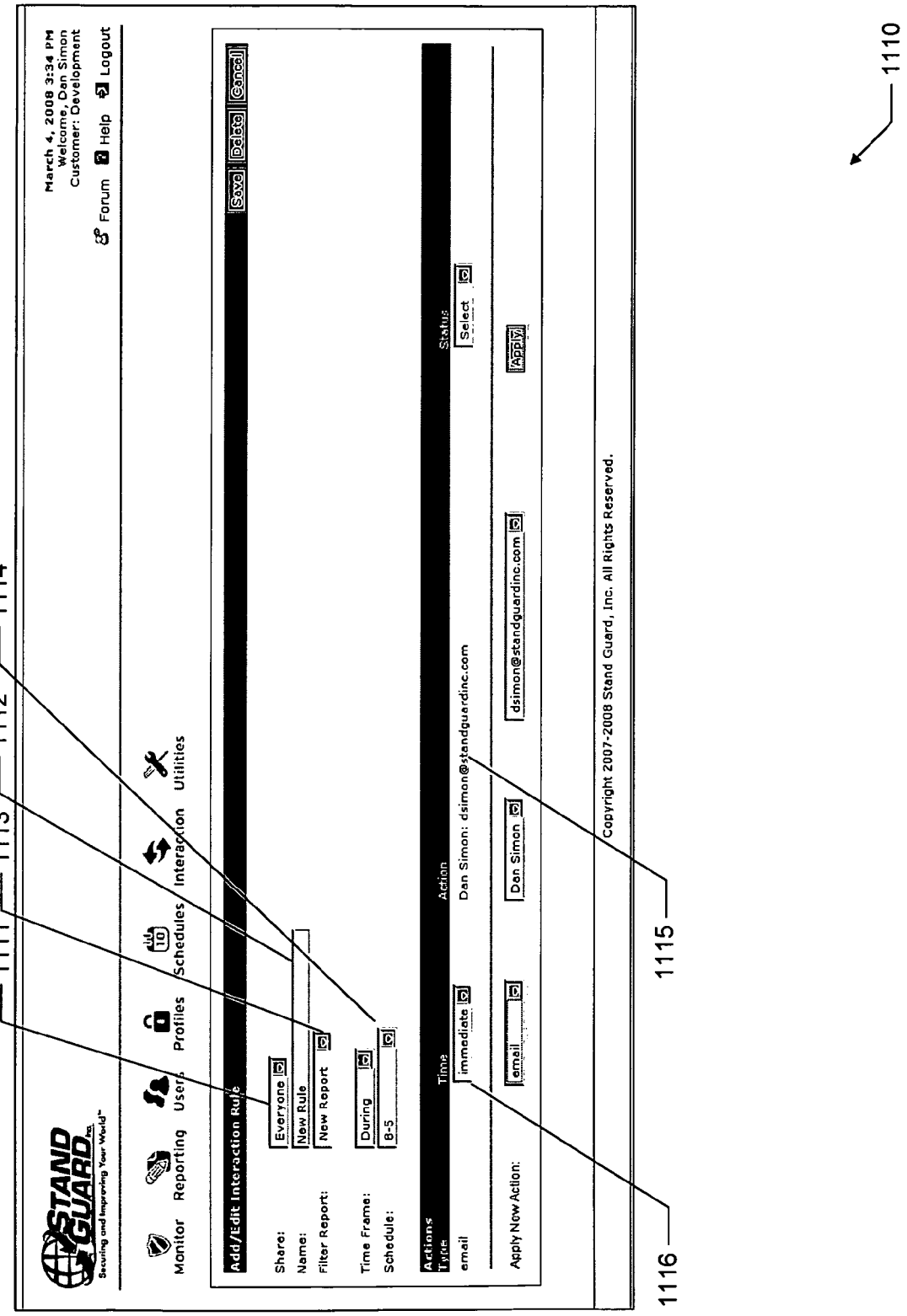
FIG. 22 is a screen shot illustrating an example embodiment of the user interface presented by the interface provider of the remote panel access system disclosed herein for enabling an operator to add or edit a rule.

FIG. 22 illustrates an example screen shot 1110 of a screen for defining a new rule or editing an existing rule. As indicated, the system enables an operator to indicate a share value 1111, a name for the rule 1112, and a filter report 1113 for defining the monitored security activities for which to generate an electronic message. The screen 1110 also enables an operator to define a time frame 1114. In the illustrated embodiment, the operator has selected During and indicated the schedule name 8-5. Thus, the rule defined in FIG. 22 will cause the system to send an electronic notification for monitored security activities occurring during the schedule defined by schedule 8-5 and satisfying the filter report entitled New Report. Finally, the system enables an operator to indicate one or more email addresses 1115 to which to send the notification, and to indicate a time frame 1116 in which to send the notification. It should be appreciated that in various embodiments, the system enables electronic notification to be sent to a plurality of individuals simultaneously or at different time intervals.

It should be appreciated that the system provides a number of vendor-specific advantages not enabled by known panel access systems. First, since in one embodiment access to the security panels of a plurality of buildings is enabled by a single server, the vendor of the server is responsible for maintaining the single piece of hardware. Such servers enable all administrative tasks such as hardware troubleshooting or software updates to be performed by an experience network administrator. This is in stark contrast to known security systems, which require security operators (typically non-experienced network administrators) to perform software updates and hardware troubleshooting. Moreover, the system enables the dealer to lock certain aspects of the software to security operators, such that proprietary dealer information is protected.

The system also reduces the impact of the problems inherent in redundantly maintaining a plurality of identically-functioning hardware devices. For example, any software updates and hardware upgrades to the system only need to be installed once. Moreover, network configuration is substantially simplified, as only a single computer must be connected to the Internet or other suitable network. Thus, dealers of the system do not need to deal with the problem of configuring a plurality of different hardware devices to co-act with each other. Additionally, since in one embodiment each security panel disclosed herein establishes a connection to the server for handling a plurality of events stored in the database every six minutes, the latest known IP address of the server is likely still to be applicable even if dynamic IP addressing is used. This removes the need to obtain a plurality of static IP addresses from an internet service provider, which can be prohibitively expensive.

The system further enables a vendor to back up security sensor data such that individual security operators do not need to back up the data. Thus, data maintenance and redundancy is handled by a party more experienced in network administration than a typical security operator.

It should be appreciated that the present disclosure is not limited to the system components discussed above, and is not limited to implementing the plurality of system components on a single piece of computer hardware. The remote panel access system disclosed herein may apply to a variety of hardware configurations, a variety of software module configurations, and a variety of data structure configurations to enable a security operator to efficiently access and control the plurality of security sensors of a plurality of remotely located security systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for enabling remote monitoring of a plurality of building security systems, said method comprising:
   establishing connections with each of a plurality of remotely located security panels, wherein each of said plurality of remotely located security panels is connected to a security sensor;
   receiving a security sensor data download signal from each of said plurality of remotely located security panels, said security sensor data download signal including data indicative of a security sensor state;
   storing said data indicative of the security sensor state in a database;
   storing a plurality of command requests, each command request indicating desired security sensor state data for the security sensor of one of said remotely located security panels;
   receiving a plurality of panel upload signals, each panel upload signal originating at one of said plurality of remotely located security panels;
   for each received panel upload signal:
   (a) determining any of said plurality of command requests related to said remotely located security panel associated with said panel upload signal,
   (b) providing said determined command request to said associated remotely located security panel,
   (c) receiving a response indicative of a success value of said command request, and
   (d) storing said response in said database,
   enabling an operator to login to access said database; and
   simultaneously displaying said response and said data indicative of a security sensor state for each of said plurality of building security systems.

2. The method of claim 1, wherein said response indicative of the success value of said command request includes at least one selected from the group consisting of: a time stamp, data indicative of a sensor state after providing said determined command request to said associated remotely located security panel, data indicative of an operating parameter, a status message, data indicative of the panel from which said response originated, and data indicative of a destination of said response.

3. The method of claim 1, including simultaneously displaying said response data and said data indicative of a security sensor state for each of said plurality of building security systems using a display device connected to a remote user terminal.

4. The method of claim 1, including enabling said remote monitoring of the plurality of building security systems via the Internet.

5. A security panel access system for remotely accessing a plurality of building security systems, said access system comprising:
   at least one microprocessor;
   at least one memory device; and
   at least one network interface device;
   wherein at least one memory device stores a plurality of instructions which, when executed by the at least one microprocessor, cause the at least one microprocessor to operate with the at least one network interface device to:
   (a) establish connections with each of a plurality of remotely located security panels, wherein each of said plurality of remotely located security panels is connected to a security sensor;
   (b) receive a security sensor data download signal from each of said plurality of remotely located security panels, said security sensor data download signal including data indicative of a security sensor state;
   (c) store said data indicative of said security sensor state in a database;
   (d) store a plurality of command requests, each command request indicating desired security sensor state data for the security sensor of one of said remotely located security panels;
   (e) receive a plurality of panel upload signals, each panel upload signal originating at one of said plurality of remotely located security panels;
   (f) for each received panel upload signal:
      (i) determine any of said plurality of command requests related to said remotely located security panel associated with said panel upload signal,
      (ii) provide said determined command request to said associated remotely located security panel,
      (iii) receive a response indicative of a success value of said command request, and
      (iv) store said response in said database,
   (g) enable an operator to login to access said database;
   (h) simultaneously display said response and said data indicative of the security sensor state for each of said plurality of building security systems;
   (i) receive a plurality of security device actuation request signals, each security device actuation signal indicating a desired actuatable security device and a desired actuated state;
   (j) store data indicative of said security device actuation request signal;
   (k) provide each of said security device actuation request signals to at least one remotely located security panel to cause said desired actuatable security device to attain said desired actuated state, wherein each remotely located security panel is connected to at least one actuatable security device;
   (l) receive security device actuation success data indicating whether each of said desired actuatable security devices attained said desired actuated state;
   (m) receive security device state data indicating a state of each desired actuatable security device;
   (n) store said security device state data in a database; and
   (o) cause a remote user terminal to simultaneously display said security device state data for each desired actuatable security device.

6. The method of claim 5, wherein said response indicative of the success value of said command request includes at least one selected from the group consisting of: a time stamp, data indicative of a sensor state after providing said determined command request to said associated remotely located security panel, data indicative of an operating parameter, a status message, data indicative of the panel from which said response originated, and data indicative of a destination of said response.

7. A security panel access system for remotely accessing a plurality of building security systems, said access system comprising:
   at least one microprocessor;
   at least one memory device; and
   at least one network interface device;
   wherein the at least one memory device stores a plurality of instructions which, when executed by the at least one microprocessor, cause the at least one microprocessor to operate with the at least one network interface device to:
   (a) establish connections with each of a plurality of remotely located security panels, wherein each of said plurality of remotely located security panels is connected to a security sensor;
   (b) receive a security sensor data download signal from each of said plurality of remotely located security panels, said security sensor data download signal including data indicative of a security sensor state;
   (c) store said data indicative of a security sensor state in a database;
   (d) store a plurality of command requests, each command request indicating desired security sensor state data for the security sensor of one of said remotely located security panels;
   (e) receive a plurality of panel upload signals, each panel upload signal originating at one of said plurality of remotely located security panels;
   (f) for each received panel upload signal:
      (i) determine any of said plurality of command requests related to said remotely located security panel associated with said panel upload signal,
      (ii) provide said determined command request to said associated remotely located security panel,
      (iii) receive a response indicative of a success value of said command request, said response including at least one selected from the group consisting of: a time stamp, data indicative of a sensor state after providing said determined command request to said associated remotely located security panel, data indicative of an operating parameter, a status message, data indicative of the panel from which said response originated, and data indicative of a destination of said response, and
      (iv) store said response in said database,
   (g) enable an operator to login to access said database; and
   (h) simultaneously display said response and said data indicative of a security sensor state for each of said plurality of building security systems.

8. A computer readable medium storing software instructions which, when executed by at least one computing device, cause the at least one computing device to:
   establish connections with each of a plurality of remotely located security panels, wherein each of said plurality of remotely located security panels is connected to a security sensor;
   receive a security sensor data download signal from each of said plurality of remotely located security panels, said security sensor data download signal including data indicative of a security sensor state;
   store said data indicative of a security sensor state in a database;
   store a plurality of command requests, each command request indicating desired security sensor state data for the security sensor of one of said remotely located security panels;
   receive a plurality of panel upload signals, each panel upload signal originating at one of said plurality of remotely located security panels;
   for each received panel upload signal:
   (a) determine any of said plurality of command requests related to said remotely located security panel associated with said panel upload signal,
   (b) provide said determined command request to said associated remotely located security panel,
   (c) receive a response indicative of a success value of said command request, said response including at least one selected from the group consisting of: a time stamp, data indicative of a sensor state after providing said determined command request to said associated remotely located security panel, data indicative of an operating parameter, a status message, data indicative of the panel from which said response originated, and data indicative of a destination of said response, and
   (d) store said response in said database,
   enable an operator to login to access said database; and
   simultaneously display said response and said data indicative of a security sensor state for each of said plurality of building security systems.

* * * * *